United States Patent [19]
Nishiyama et al.

[11] Patent Number: 5,367,411
[45] Date of Patent: Nov. 22, 1994

[54] MAGNETIC RECORDING AND REPRODUCING APPARATUS WITH REPRODUCING HEAD OF MAGNETORESISTIVE TYPE HAVING CONTROL OF MAGNETIC BIAS LEVEL

[75] Inventors: Nobumasa Nishiyama, Hachiouji; Yasuhiro Kato, Nishitama; Toshiaki Tsuyoshi, Kawasaki, all of Japan

[73] Assignee: Hitachi, Ltd., Tokyo, Japan

[21] Appl. No.: 923,833

[22] Filed: Aug. 3, 1992

[30] Foreign Application Priority Data

Aug. 2, 1991 [JP] Japan .................. 3-194244
May 29, 1992 [JP] Japan .................. 4-139196

[51] Int. Cl.5 .................. G11B 5/03; G11B 5/127; G11B 5/33
[52] U.S. Cl. .................. 360/66; 360/113
[58] Field of Search .................. 360/66, 45, 46, 48, 360/51, 65, 67, 113; 369/59

[56] References Cited

U.S. PATENT DOCUMENTS

| | | | |
|---|---|---|---|
| 4,644,424 | 2/1987 | Nishiyama et al. | 360/65 |
| 4,748,611 | 5/1988 | Tsuyoshi et al. | 360/48 X |
| 4,774,601 | 9/1988 | Ouchi et al. | 360/51 X |
| 4,823,208 | 4/1989 | Ouchi et al. | 360/67 X |
| 4,907,100 | 3/1990 | Nishiyama et al. | 360/45 |
| 5,008,761 | 4/1991 | Nishiyama et al. | 360/45 |
| 5,193,034 | 3/1993 | Tsuyoshi et al. | 360/51 |

*Primary Examiner*—Donald Hajec
*Assistant Examiner*—Patrick Wamsley
*Attorney, Agent, or Firm*—Antonelli, Terry, Stout & Kraus

[57] ABSTRACT

A magnetic recording and reproducing apparatus, comprising a magnetic recording medium, a head arrangement for reading data from or writing data on the magnetic recording medium including an inductive recording head and a magnetoresistive reproducing head, and a phase discriminating circuit for discriminating data '1' from peaks of a waveform reproduced by the head. The phase discriminating circuit has a differential circuit for differentiating the waveform, a pulse circuit for producing a zero cross pulse from a zero-level crossing point of the differentiated waveform, a discriminating circuit for discriminating '1' and '0' of the data with use of pulses output from the pulse circuit and a discriminating window needed for judgment of '1' and '0' of the data, and a decoding circuit for decoding and feeding out the data output of the discriminating circuit. The head comprises a recording head of inductive type, and a reproducing head of magnetoresistive type. The phase discriminating circuit comprises a circuit for controlling a magnetic bias level for the magnetoresistive reproducing head so that a change of resistance of the magnetoresistive reproducing head due to magnetic field is made virtually equal both at positive and negative polarity waveform peaks.

10 Claims, 20 Drawing Sheets

|  | SECTION | | | |
|---|---|---|---|---|
|  | a | b | c | d |
| DISCRIMINATING WINDOW A | 1 | 1 | 1 | 1 |
| DISCRIMINATING WINDOW B | 0 | 1 | 1 | 1 |
| DISCRIMINATING WINDOW C | 0 | 0 | 1 | 1 |
| DISCRIMINATING WINDOW D | 0 | 0 | 0 | 1 |

| SECTION a b c d | CLASSIFIED PATTERN | CONTROL SIGNAL (VOLUME) |
|---|---|---|
| 0 0 0 0 | ③ | INC (LARGE) |
| 0 0 0 1 | ④ | INC (SMALL) |
| 0 0 1 0 | ⑤ | INC (LARGE) |
| 0 0 1 1 | ② | — |
| 0 1 0 0 | ⑤ | INC (LARGE) |
| 0 1 0 1 | ⑥ | — |
| 0 1 1 0 | ① | INC (LARGE) |
| 0 1 1 1 | ④ | DEC (SMALL) |
| 1 0 0 0 | ④ | INC (SMALL) |
| 1 0 0 1 | ① | DEC (LARGE) |
| 1 0 1 0 | ⑥ | — |
| 1 0 1 1 | ⑤ | DEC (LARGE) |
| 1 1 0 0 | ② | — |
| 1 1 0 1 | ⑤ | DEC (LARGE) |
| 1 1 1 0 | ④ | DEC (SMALL) |
| 1 1 1 1 | ③ | DEC (LARGE) |
| SAME VALUE | | — |

● ··· POSITIVE POLARITY SIDE

○ ··· NEGATIVE POLARITY SIDE

NUMERAL ENCLOSED BY ○ DENOTES NUMBER OF CLASSIFIED PATTERN

X ··· GRADIENT OF DIFFERENTIAL WAVEFORM IN POSITIVE POLARITY SIDE AT ZERO-LEVEL CROSSING POINT

Y ··· GRADIENT OF DIFFERENTIAL WAVEFORM IN NEGATIVE POLARITY SIDE AT ZERO-LEVEL CROSSING POINT

MAGNETIC RECORDING AND REPRODUCING APPARATUS WITH REPRODUCING HEAD OF MAGNETORESISTIVE TYPE HAVING CONTROL OF MAGNETIC BIAS LEVEL

BACKGROUND OF THE INVENTION

The present invention relates to a digital magnetic recording and reproducing apparatus for reproducing data recorded on a recording medium in a digital fashion by a reproducing head of a magnetoresistive type (MR head), and more particularly concerns a magnetic recording and reproducing apparatus preferably for reproducing data recorded at a high density and for transferring the data at a high rate. Also, it relates to a magnetic recording and reproducing apparatus for reproducing data recorded on a magnetic recording medium using a reproducing magnetic head made of a magnetoresistive element (MR element), and more particularly concerns a magnetic recording and reproducing apparatus for high-density recording and for a high-rate transfering of data with compensation for non-linear distortion proper to the MR element and further particularly concerns a magnetic recording and reproducing apparatus having a reproduced signal processing circuit preferably to prevent the MR element from damage due to its intermittent contact with the magnetic recording medium or due to an overcurrent upon its floating above an extremely narrow gap and to suppress possible electromigration.

A magnetic head of inductive type has been conventionally used for recording on or reproducing data from a magnetic recording medium. However, its requirements in view of recording, for example, the pole-tip length and the length of a gap between the pole-tips, do not always coincide with the requirements in view of reproduction.

To increase the recording density, for example, a coercive force of the recording medium has to be increased. For recording on the recording medium having a high coercive force, the recording magnetic field from head has to be made high. Accordingly a higher recording magnetic field requires greater pole-tip and gap length. In view of highly sensitive, highly resoluble reproduction, on the other hand, it is rather preferable to make the pole-tip length and gap length small. In such requirements, the recording head should be separated from the reproducing head.

On the other hand, if the inductive type reproducing head has a coil having an increased number of turns to make the reproduced voltage high, head noises become high, and increased head pole-tip length lowers the reproduction efficiency. These factors also undesirably lower the signal-to-noise ratio, resulting in an increase of jitter. In order to solve such problems, it is effective to use a magnetoresistive element for the reproducing head as it reduces the head noises.

The magnetoresistive element makes use of its physical property that its electrical resistance is changed according to a sensed intensity of a magnetic field so that it can obtain the intensity of the magnetic field by detecting the change of the electrical resistance.

In the prior art, in order to detect the intensity of the magnetic field, or the electrical resistance, a constant dc current called the sense current is made to flow to have a voltage drop across the magnetoresistive device. The highest voltage drop and the lowest one correspond to reversal positions of magnetization, which are detected as data of '1' and '0'. In the prior art is used a level detection method for discriminating '1' and '0' depending on the voltage level. Change of the electrical resistance of the magnetoresistive element to the magnetic field applied thereto is non-linear as shown in FIG. 4.

The electrical resistance differs in its rate of change in the input positive magnetic field and the negative one. The positive polarity and negative polarity of change in the electrical resistance thus have different amplitudes. In the prior art level detection method is controlled a biased magnetic field so that the upper and lower half amplitudes should be made equal, as in the Japanese Patent Application Laid-Open No. 03-12005. For higher recording density and higher data transfer rate, however, the data discriminating window has to be made narrower in its period of time. It thus is difficult to detect the level.

For the reason, a phase discrimination method has been employed as a method which is easier to implement than the level detection method for detecting the reversal of magnetization with little error.

There have been many prior disclosures about the MR element and reproducing circuit system having it used therewith to reproduce the magnetic data recorded on the recording medium. The MR element is an element the electrical resistance of which corresponds to a vector value of the input magnetic field. The MR element has a biased magnetic field applied thereto if the magnetic data are reproduced from the recording medium. Resistance of the MR element is changed as magnetic flux is made to flow thereinto from the magnetic recording medium. The change of resistance is converted to change of voltage across the MR element by a sense current. A succeeding reproducing circuit amplifies the voltage across the MR element to reproduce the magnetic data recorded on the recording medium.

However, the prior art reproduction of the recorded data with use of the MR element has the disadvantage that the reproduced waveform by the MR element involves non-linear distortion as the change of the resistance of the MR element to the flowing magnetic device is properly non-linear as described above.

Therefore, two MR element have been conventionally combined together differentially to take out the differential signals only. The differentially combined differential signals solve the problem of non-linear distortion as their non-linear distortions cancel out each other if any.

Also, the prior art MR element has the disadvantage that voltage drop is caused by the sense current as it is a kind of resistor. The MR element therefore has a potential difference from a reference potential. Since the recording medium is ordinarily set at the reference potential, a potential difference is caused between the MR element and the recording medium. If the MR element is brought contact with or extremely close to the recording medium, overcurrent will flow between the MR element and the recording medium, resulting in damage of the MR element. To solve that problem, as an example, there has been proposed a technique in the Japanese Patent Application Laid-Open No. 2-94103. In the technique, the MR element has a sensor placed in parallel therewith to detect the potential thereof. On the basis of the signal output of the sensor, a bias current for setting the potential of the MR element is controlled in a negative feedback way. After the feedback, the bias current and the sense current for the MR element are controlled to be equal. Since magnitude of the sense current cannot be controlled, however, the technique cannot resolve the problem of non-linear distortion.

In particular, the prior art phase discrimination method for the inductive type head is used properly for the high density recording and high rate data transfer, the peaks of the reproduced waveform are dispersed in the sharpness even with use of the biased magnetic field method disclosed in the Japanese Patent Application Laid-Open No. 03-12005. The peaks thus have different gradients at the zero-level crossing point when differentiated.

The phase discrimination method is a method that a zero cross pulse is generated at the zero-level crossing point of the differential waveform reproduced by the reproducing head. The data of '1' and '0' can be discriminated depending on whether the pulse is present or not in the data discriminating window. In the method, such a virtually constant amount of noises as the circuit noise and head noise are superimposed on the reproduced waveform. The dispersion of jittered zero cross pulses becomes wider at a slow gradient of the differential waveform. This may cause a discrimination error so that it can prevent the high recording density and high rate data transfer.

In order to solve the problem of non-linear distortion, as described above, the two MR elements have been conventionally combined together differentially to take out the differential signals only. The track width is made narrow with the high density recording of the magnetic recording apparatus. For the reason, reproduction with only one MR element is needed. Since the resistance change of the MR element to the magnitude of flowing magnetic field proper to the MR element is non-linear, the peak of the reproduced waveform involves the non-linear distortion. If a reproduced signal process (differentiation detection) is made in the state of such a reproduced waveform, reproduction error may be caused on the peak side of greater distortion.

Further, since the MR element is a kind of resistor, voltage drop is caused by the sense current, as described above, the MR element has the potential difference to the reference potential. The magnetic recording medium, on the other hand, is ordinarily set at the reference voltage. The potential difference is caused between the MR element and the recording medium. If the MR element is brought contact with or extremely close to the recording medium, overcurrent will flow between the MR element and the recording medium, resulting in damage of the MR element.

SUMMARY OF THE INVENTION

A first object of the present invention is to provide a magnetic recording and reproducing apparatus that is capable of high density recording and high rate data transfer with little jitters in reproduction.

A second object of the present invention is to provide a magnetic recording and reproducing apparatus with a MR element having a circuit preferable to equivalently eliminate non-linear distortion of a reproduced waveform.

A third object of the present invention is to provide a magnetic recording and reproducing apparatus with a MR element having a sense current bias control circuit of preventing overcurrent between the MR element and a recording medium.

A fourth object of the present invention is to provide a magnetic recording and reproducing apparatus with a MR element having a sense current switching control circuit preferable to prevent deterioration of its service life due to electromigration of a MR head.

The first object is accomplished according to the present invention by providing a magnetic recording and reproducing apparatus which comprises a inductive type head, a reproducing magnetoresistive type head, and means for controlling a magnetic bias level for the magnetoresistive reproducing head so that change of resistance of the megnetoresistive reproducing head to the applied magnetic field is made virtually equal both at peaks of the positive and negative polarity waveforms.

The means for controling the magnetic bias level for the magnetoresistive reproducing head so as to make the change of resistance of the magnetoresistive reproducing head to the magnetic field virtually equal both at the peaks of the positive and negative polarity waveforms, is to control the magnetic bias level for the magnetoresistive reproducing head so that dispersion of jittered zero cross pulses made of the positive polarity waveform of a signal reproduced by the magnetoresistive reproducing head should be made virtually equal to dispersion of jittered zero cross pulses made of the negative polarity waveform.

The non-linear distortion proper to the MR element is due to a rate of change in the resistance of the MR element to flowing magnetic field (called the $\rho$-H characteristic), and it is due to a magnetoresistance function of a material composition. The non-linear distortion appears, for example, where the magnetic field flowing to the MR element can be highest or lowest at a reversal portion of magnetization of the recording medium, or at a highest portion of the magnetic flux density. If the biased magnetic field is improper, a reproduced voltage waveform can be obtained through the $\rho$-H characteristic having different gradients at the highest and lowest flowing magnetic field. The upper and lower peak shapes and amplitudes are asymmetric with respect to the origin.

If the prior art differential detection method is used for the reproduced signal processing method of the magnetic recording and reproducing apparatus, the differential gradient is gentle on the peak side having higher non-linear distortion of the MR reproduced waveform. This increases dispersion of jittered zero cross pulses, resulting in readout error.

The second object is accomplished in accordance with aspects of the present invention as follows: A reproduced signal processing circuit is provided with means for evaluating the jitters on the positive and negative peaks and for controlling the sense current and biased magnetic field so that the both peaks should have virtually equal dispersion.

If the sense current for the MR element is changed, the MR element has a potential as it is a resistor. It therefore has a potential difference from the magnetic recording medium ordinarily set at a reference potential.

The third object is accomplished according to the present invention by providing means for controlling the potential so that the potential of the MR element can be virtually equal to that of the recording medium even if the sense current is changed.

The electromigration is caused by movement of atoms in a substance as current is made to flow therein.

The fourth object of the present invention is accomplished by means for alternating the direction of the sense current flow in the MR element at intervals of a certain period so as to prevent the atoms from moving.

The present invention can make no difference of the dispersions of jittered zero cross pulses on the positive and polarity sides of the reproduced waveform due to the non-linear change of the electrical resistance of the magnetoresistive element to the magnetic field applied across the magnetoresistive element, resulting in decrease of the jitters themselves. This can increase the data transfer rate and recording density of the apparatus and the recording capacity as well.

The present invention can detect effect of the non-linear distortion as the dispersion of jittered zero cross pulses to control the sense current so that no difference of the dispersions of jittered zero cross pulses cannot be made. In other words, it has an advantage of high density recording and high rate data transfer since it can equivalently solve the effect of the non-linear distortion. Also, it has another advantage that its control of the sense current makes no difference between the MR head and the recording medium so that possible short-circuit of the MR element to the recording medium cannot damage the MR element. Further, it has still another advantage that the offset voltage can be stripped off as the signal components alone can be taken out by change of the resistance of the MR element. Further more, it has still another advantage that most of the circuits can be easily circuit-integrated as its offset voltage stripping circuit contains few capacitors and inductors. In addition, it has still another advantage that service life of the MR head can be long to a great extent as it overcomes the electromigration.

BRIEF DESCRIPTION OF THE DRAWINGS

Other objects and advantages of the present invention will further become apparent thereinafter and in the drawings in which.

DETAILED DESCRIPTION OF THE PREFERRED EMBODIMENTS

Figure 2:
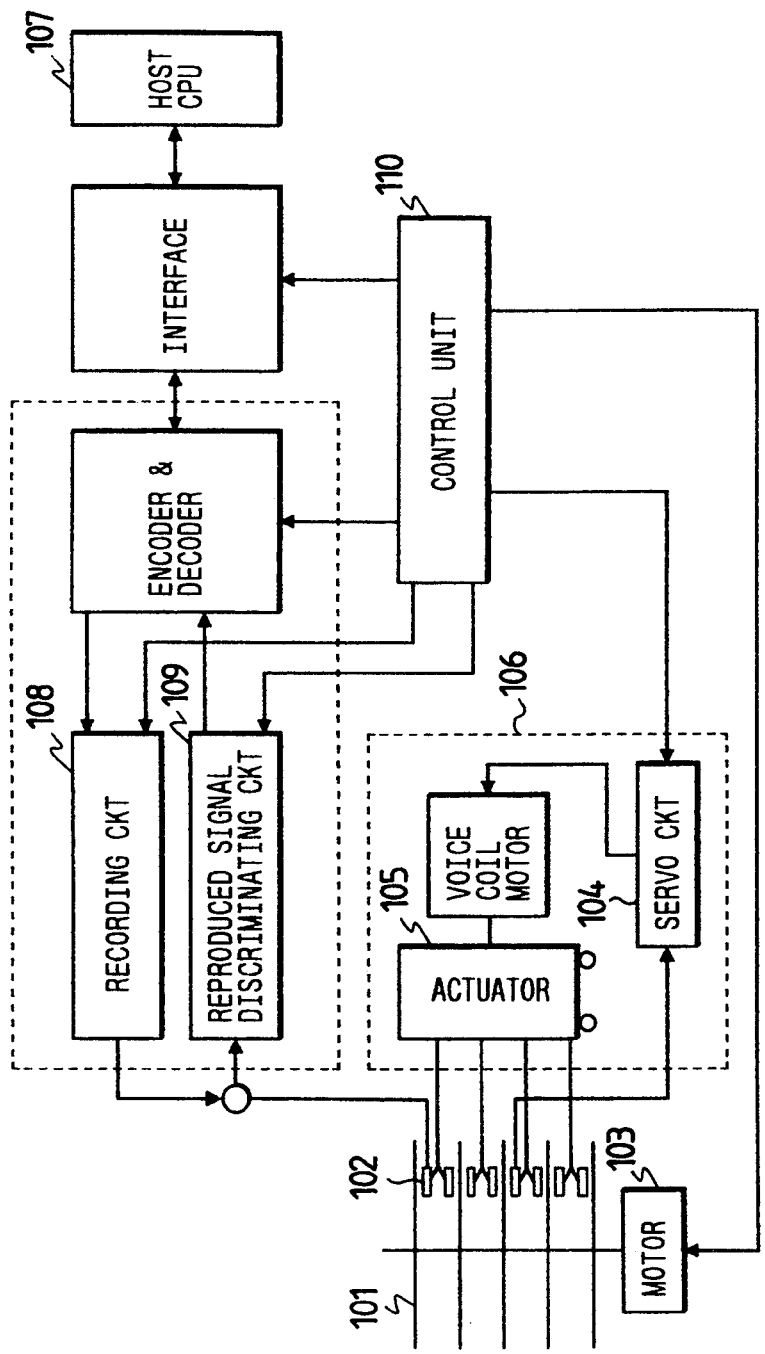
FIG. 2 illustrates an overall construction of a magnetic disk apparatus.

The present invention is illustrated in further detail by reference to the accompanying drawings. First, FIG. 2 is an overall construction of the magnetic disk apparatus. The magnetic disk apparatus can be broadly divided into several functioning sections: a magnetic disk 101 for storing data, a magnetic head 102 for recording on or reproducing the data from the magnetic disk 101, a spindle motor 103 for effecting relative rates of the magnetic disk 101 with respect to the magnetic head 102, a positioning system 106 having a servo circuit 104 and an actuator 105 provided for recording the data on predetermined positions of the magnetic disk 101, a recording circuit 108 for converting the data of '0' and '1' to signals before recording magnetically with use of the magnetic head 102, a reproduced signal discriminating circuit 109 for reproducing the magnetically recorded data with use of the magnetic head 102, converting them to data of '0' and '1' and feeding them to the host CPU 107, and a control unit 110 for controlling the functioning sections.

The present invention applies to the reproduced signal discriminating circuit 109 to increase performance of the magnetic disk apparatus. It also can be applied to process a servo signal of the positioning system 106, thereby also being capable of increasing the performance of the magnetic disk apparatus.

Figure 3:
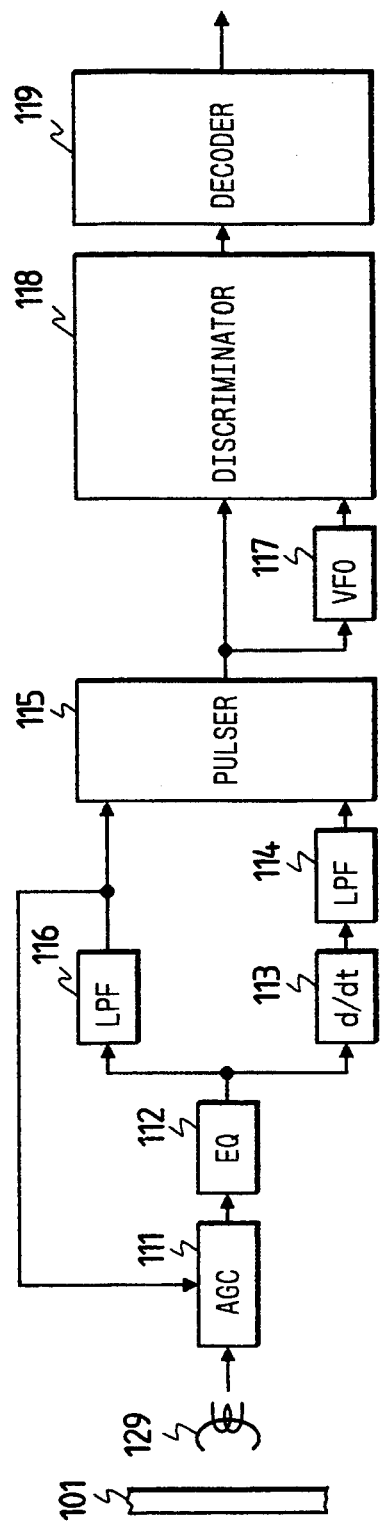
FIG. 3 is a block diagram for a prior art data discriminating circuit of differential type.
Figure 4:
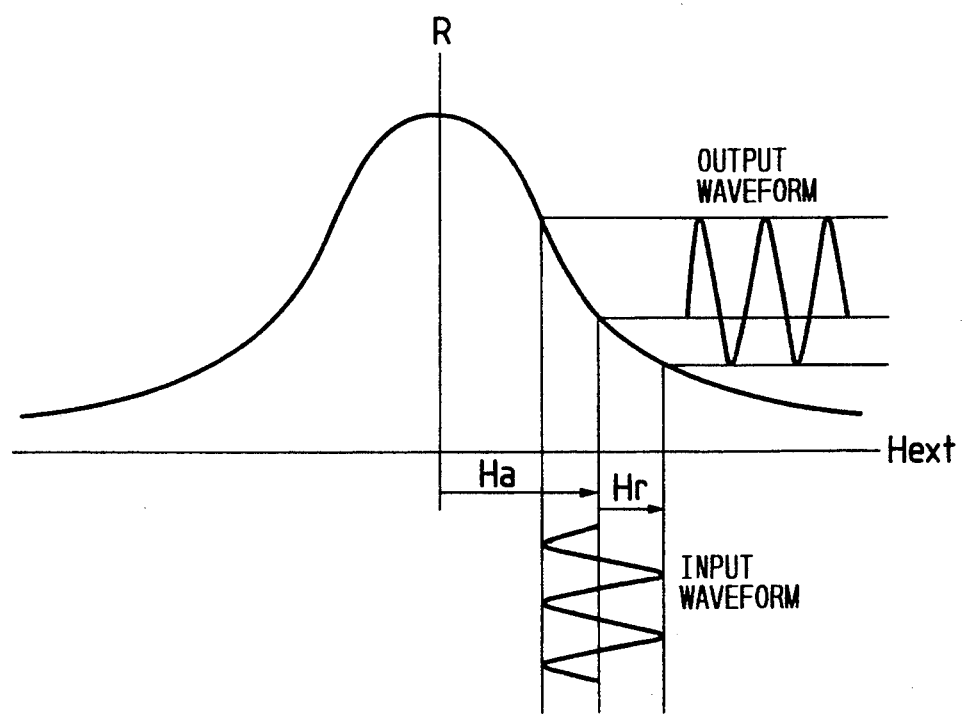
FIG. 4 is a a graph showing a change of an electrical resistance of a magnetoresistive element to a magnetic field applied thereto with an input and output waveforms.

FIG. 3 is a usual phase discriminating circuit that is a kind of the reproduced data discriminating circuit. Usual magnetic disk apparatuses use the NRTI (abbreviated for Non-Return to Zero Inverse) recording method in which the data of '1' are used to record magnetically in way of reversal of magnetization. In the recording method a peak point of a waveform corresponds to the data of '1' when it is reproduced by the magnetic head 102. It is needed to have a function for discriminating the data of '1' from the peak point of the reproduced wave form. The said phase discriminating circuit provides that function. The circuit operates in the way that a signal reproduced by an inductive magnetic head 129 is fed to an automatic gain controlled amplifier (AGC) 111 to regulate its amplitude to a certain constant level. A signal output of the automatic gain control 111 is intersymbol-interferred by adjacent bits. In order to remove the intersymbol interference. The output signal is fed into an equalizer (EQ) 112. An signal output of the equalizer 112 is divided into two routes. One enters a differentiating circuit 113 to convert the peak point of the waveform to a zero cross signal. It is undesirable that the differentiating circuit 113 can emphasize noises except in a band needed as frequency is high. In order to remove the undesirable noises, an out of the differentiating circuit 113 is fed through a low-pass filter (LPF) 114. A next pulser 115 forms the zero cross signal of the zero-level crossing point of the differential waveform. It however may generate the zero cross signal of the differential waveform even around the peak of the waveform as the reproduced signal of low frequency is like isolated waveform. To avoid this, the signal output of the equalizer 112 on the other route is used to eliminate the zero cross pulses other than the peak of the waveform. This can be made as follows: First, the waveforms output of the equalizer 112 containing the noises except in the necessary band that have been superimposed thereon are eliminated as passed through a low-pass filter (LPF) 116. The remaining waveforms are fed to the pulser 115 so that it can be amplitude-detected at a certain slice level. If there is an amplitude higher than the slice level and at the same time if the zero cross pulse is generated, then it is decided that the zero cross pulse is equal to the peak of the waveform, On the basis of the zero cross pulse made equal to the peak are discriminated the data of '1' and '0' as follows: First, a time measure called the discriminating window is made which is necessary to decide whether the datum is '1' or '0'. The discriminating window is formed by a variable frequency oscillator (VFO) 117 comprising a phase-locked loop oscillator synchronized with the zero cross pulse- The discriminating window and a signal output of the pulser 115 are fed to a discriminator 118. The discriminator 118 discriminates if the discriminating window contains the zero cross pulse or not. If so, the discriminator 118 feeds '1' out. If not, it feeds '0' out. A decoder 119, in turn, decodes data output of the discriminator 118 to data of '1' and '0' that can be treated as data for the host CPU 107, a control processing unit.

Figure 5:
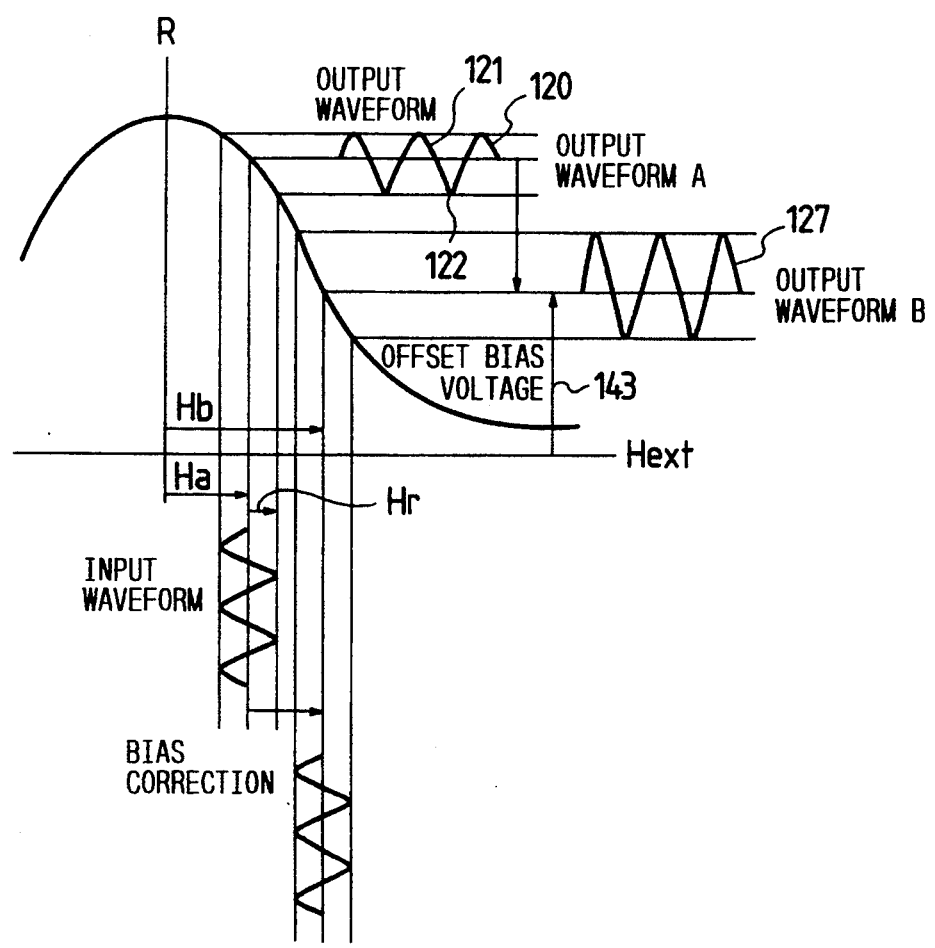
FIG. 5 is a graph illustrating a change of an input and output waveforms of a magnetoresistive element to a biased magnetic field applied thereto.
Figure 6:
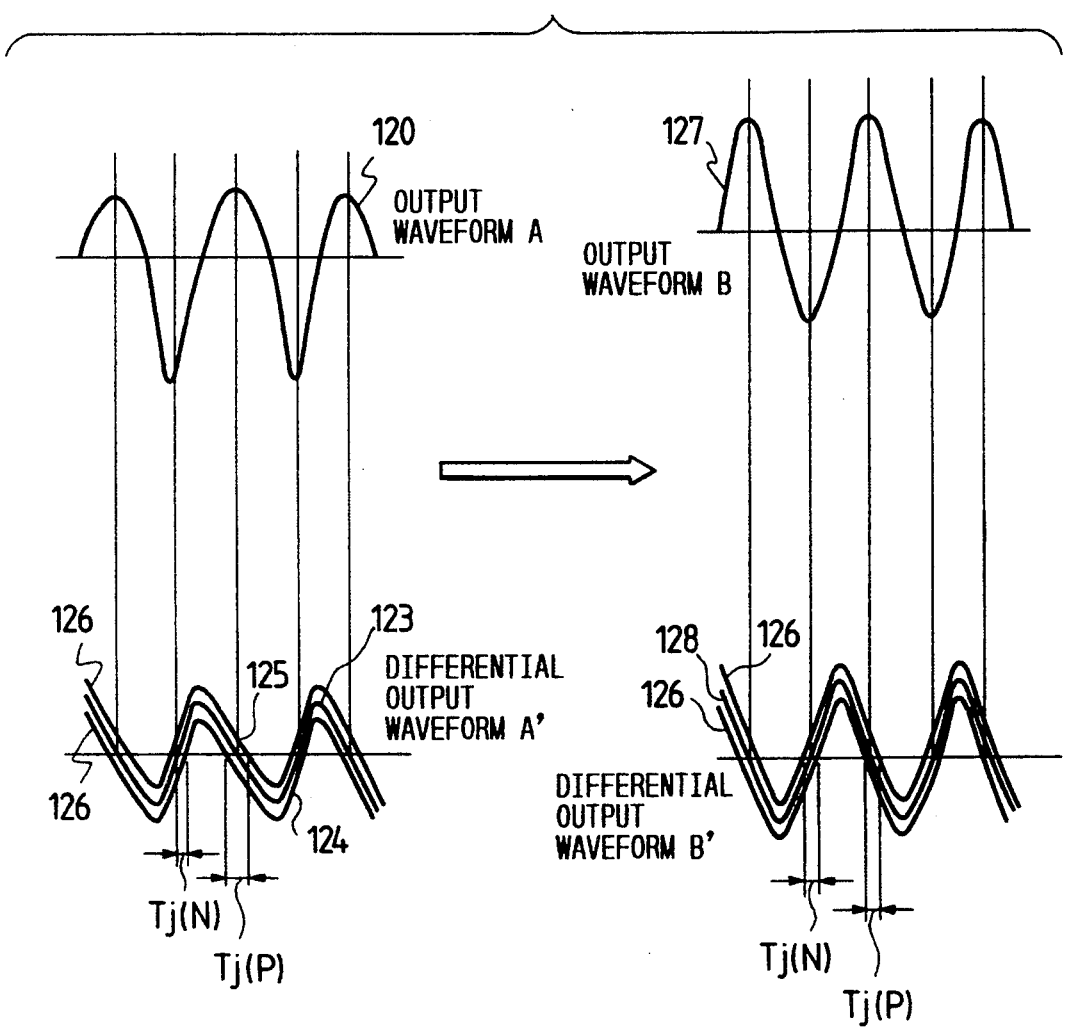
FIG. 6 is a graph showing differentiated waves to a biased magnetic field of a magnetoresistive element.

In turn, the following describes the object and principles of the present invention by referring to FIGS. 5 and 6. FIG. 5 is a relationship between magnitude of a biased magnetic field of a magnetoresistive element and the then reproduced voltage waveform. If the megnetoresistive element is used as the reproducing head, the megnetoresistive element has a biased magnetic field Ha applied thereto, and a reproduced magnetic field Hr is superimposed on the biased magnetic field before being input. From the relationship of the electrical resistance to the magnetic field applied at the biased magnetic field is obtained an output waveform A 120 as shown in FIG. 5. It is found in the figure that the waveform of the negative polarity 122 has sharper peaks than that of the positive polarity 121.

In turn, FIG. 6 shows the waveform A 120 output of the magnetoresistive element and the differentiated waveform A' 123 output of the phase discriminating circuit system described above. If the waveform of the positive polarity, like the waveform A 120 output of the magnetoresistive element, is less sharp than that of the negative polarity a differential gradient 125 corresponding to the peak of the positive polarity, like a differential waveform A' 123, is more gentle than a differential gradient 124 corresponding to the peak of the negative polarity. Since circuit and magnetoresistive element noises 126 are uniformly superimposed on all portions of the waveform, the dispersion of zero-level crossing points of the differentiated waveform becomes wide as the differential wave gradient is gentle. The width is dispersion Tj of jittered zero cross pulses. As a result, the dispersion Tj(P) of jittered zero cross pulses corresponding to the positive polarity becomes wider than the dispersion Tj (N) of jittered zero cross pulses corresponding to the negative polarity.

In FIG. 5, if the biased magnetic field is set to Hb, the peaks of the positive and negative polarity become virtually equal in the sharpness as indicated by a waveform B 127 output of the magnetoresistive element. A differential waveform B' 128 in the state is shown in FIG. 6. Gradients of the differential waveform B' corresponding to the peaks of the positive and negative polarities are virtually equal. The dispersions Tj (N) and Tj (P) of jittered zero cross pulses become virtually equal even with superimposition of the noises.

With the principles described so far, the biased magnetic field can be controlled so that the dispersions of jittered zero cross pulses at the positive and negative polarity sides can be virtually equal. That is, the dispersions of jittered zero cross pulses at the positive and negative polarity sides can be detected and compared, and the results can control the biased magnetic field so that any of the magnetoresistive element can have an optimum biased magnetic field applied thereto. Since then the dispersions of jittered zero cross pulses at the positive and negative polarity sides are virtually equal, the jittered zero cross pulses themselves can be made small for high rate transfer, high recording density, and high recording capacity.

Figure 1:
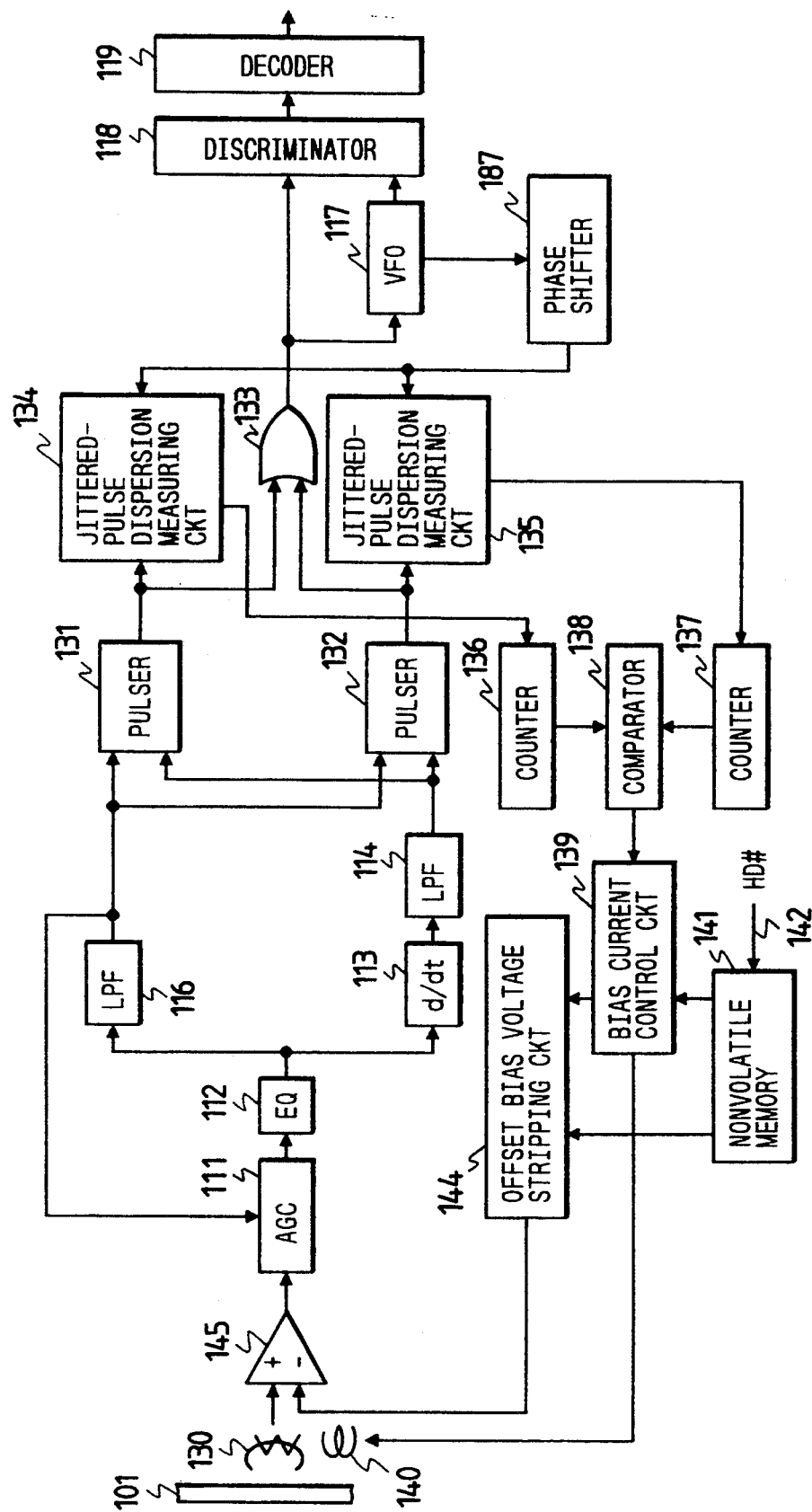
FIG. 1 shows an embodiment for a phase discriminating circuit according to the present invention.

In turn, the following describes an embodiment of the phase discriminating circuit according to the present invention by referring to FIG. 1. FIG. 1 is a block diagram for the embodiment for effecting control so that a rate of change of resistance of the magnetoresistive element in relation to a magnetic field is made substantially equal both for the positive polarity waveform peak and the negative polarity waveform peak. For the purpose, a magnetic bias level of the said magnetoresistive element is controlled so that the jitters can be made equal on the both peaks.

In the following are described differences of use of the magnetoresistive element reproducing head 130 from the usual phase discriminating circuit while its outline and functions are compared with the principles. A first change is in that the pulser for producing the zero cross pulse is divided to a positive polarity pulser 131 for producing a zero cross pulse of the positive peak of the waveform output of the magnetoresistive element and a negative polarity pulser 132 pulser for producing the other zero cross pulse of the negative polarity peak. This is to allow the zero cross pulse at the positive polarity side and the one at the negative polarity side to be controlled individually. The individually produced zero cross pulses are synthesized through an OR circuit 133. The synthesized pulse is fed through a variable frequency oscillator (VFO) 117 to a discriminator 118 as usual.

On the other hand, signals output of the positive polarity pulser 131 and the negative polarity pulser 132 are fed to jittered-pulse dispersion measuring circuits 134 and 135 for measuring dispersions of jittered zero cross pulses, respectively. The circuits 134 and 135 will be described in detail later. There are provided counters 136 and 137 corresponding to their respective timing positions in the discriminating windows. Signals output of the circuits 134 and 135 are fed to the respective counters 136 and 137 corresponding to the timing positions of the zero cross pulses. This process is made for a plurality of zero cross pulses. A time position of a maximum value of the counters is regarded as a averaged value. Time dispersion around the averaged value indicates the dispersion of a jittered zero cross pulse.

In turn, counts of the counters 136 and 137 are compared by a comparator 138. Results are classified into a number of patterns. The patterns are used to control bias current for controlling the biased magnetic field. A bias current control circuit 139 controls the bias current on the bases of the comparison results. A magnetic field generating device 140 for the magnetoresistive device which is provided in the vicinity of the magnetoresistive element controls the biased magnetic field on the basis of the controlled bias current. The biased magnetic field control method described above is used for the current bias type of magnetoresistive element.

For the other type of magnetoresistive element, the magnetic field control can be made by modifying the bias current control circuit 139. For a shunt type of magnetoresistive element shown in FIG. 18, as an example, a bias can be kept optimum so that a current control current can control a sense current. Since change of a sense current becomes change of readout sensitivity, the change of the sense current can be converted to change of voltage by means of a reference resistor for use in gain correction of AGC. This can correct the change of readout sensitivity.

Alternatively, the biased magnetic field can be controlled in a way that signals output of the positive and negative polarity pulsers are compared for every pulse, and a value corresponding to their difference is used as difference of the jitter dispersions.

On the other hand, in FIG. 1, if a new magnetoresistive element is selected, the bias current control circuit 139 has to first give an initial biased magnetic field to the selected megnetoresistive element. For the purpose, the initial values for the magnetoresistive elements should be read out of a nonvolatile memory 141. In the readout, contents of nonvolatile memory 141 are read out according to data of a head select signal (HD#) 142 connected to the nonvolatile memory 141.

If the biased magnetic field is changed, an offset bias voltage 143 superimposed on the output waveform A is changed as shown in FIG. 5. For the reason, change of the offset bias voltage is leaked out even in a capacitance coupling method for blocking the offset bias voltage. To avoid this, a offset bias voltage stripping circuit 144 has a bias current value fed in from the bias current control circuit 139 to obtain the offset bias voltage corresponding to the bias current. The offset bias voltages and signal outputs of the magnetoresistive elements are fed to respective pins of a differential amplifier 145. The differential amplifier 145 eliminates the offset voltage to feed out only the signal to the automatic gain control 111. This can reduce the superimposition of the noises on the signal to a great extent.

Also, as an example, the offset bias voltage stripping circuit 144 makes approximate functions of relationships between the biased magnetic fields and electrical resistances of the magnetoresistive elements, and reads coefficients of any of the functions out of nonvolatile memory 141 for each megnetoresistive element. Any of the offset bias voltages can be obtained by using the function in terms of the bias current.

Further, as another example, any of the offset bias voltage can be obtained in a way that a relationship between the biased magnetic field and the electrical resistance of the magnetoresistive element are stored directly. The stored data are used to obtain the offset bias voltage. The data to be read out may be either of the ones common to all the magnetoresistive elements or the ones for any of the magnetoresistive elements.

Figures 7, 8:
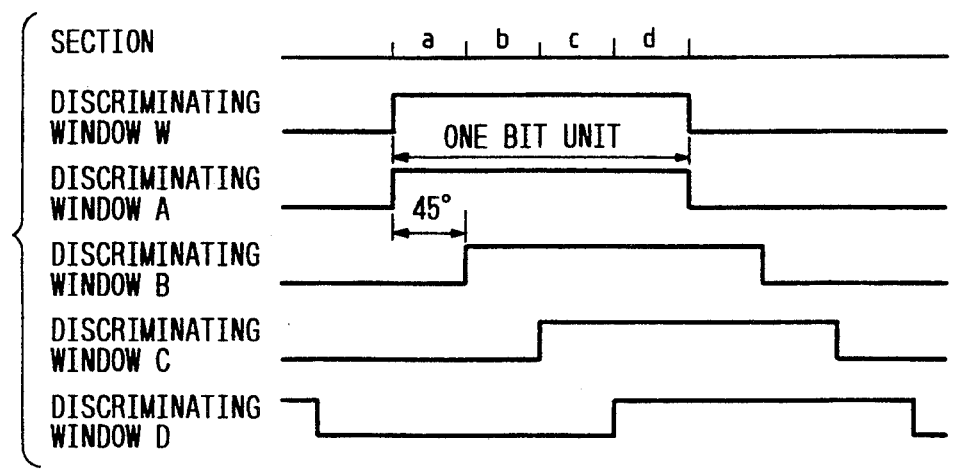
FIG. 7 illustrates an example of dividing method for dividing a discriminating window into four sections.
FIG. 8 is a truth table showing a relationship between four sections and four kinds of discriminating window.

In turn, principles of the jittered-pulse dispersion measuring circuits 134 and 135 for measuring dispersion of jittered zero cross pulses are described by reference to FIGS. 7, 8, and 9. For description of the principles, FIG. 7 illustrates the an embodiment of the present invention for an section dividing method in which the discriminating window is divided into four sections. In the figure, the discriminating window W is a usual discriminating window signal for discriminating data of '1' and '0'. Any of the measuring circuits can divide an inside of the discriminating window W into the four sections, and detects and counts the zero cross pulses in the sections.

As an example, the four sections can be produced in a way that a phase shifter 187 makes phase of the discriminating window W delay 45 degrees successively to form four phase-shifted discriminating windows A, B, C, and D. A relationship between the four phase-shifted discriminating windows and the four sections is defined as follows: If the discriminating window A is at logical high level (hereinafter referred to as H) and if the discriminating windows B, C, and D are at logical low level (hereinafter referred to as L), then the section is section a. If the discriminating windows A and B are at H and if the discriminating windows C and D are at L, then the section is section b. If the discriminating windows A, B, and C are at H and if the discriminating window D is at L, then the section is section c. If all the discriminating windows A, B, C, and D are at H, then the section is section d.

On the other hand, units of a bit is a half cycle of any of the discriminating windows, that is, a period of time at the level H or L. Since the discriminating window W is at H in the embodiment shown in FIG. 7, the sections have been allocated in terms of the discriminating windows A to D as described above. If the discriminating window W is defined at L, any of the sections in terms of the discriminating windows A to D should have "L" read for "H" and "H" for "L".

FIG. 8 is a truth table showing the relationship between the sections a to d and the discriminating windows A to D, wherein '1' indicates the same logical level as the discriminating window W, and '0' is reverse logical level.

Figure 9:
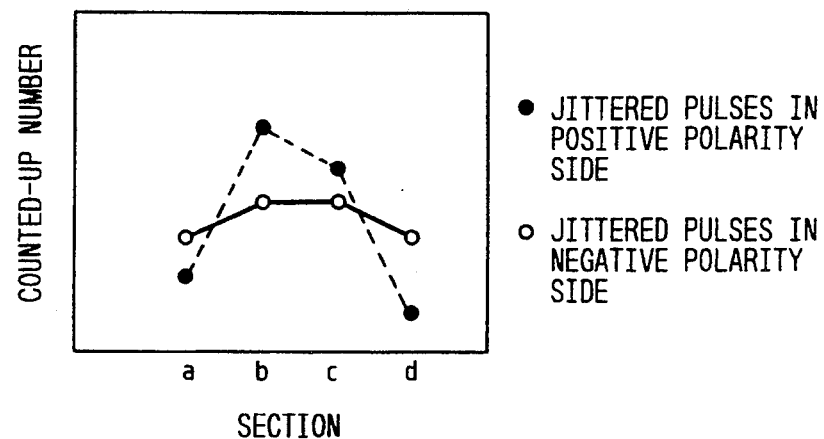
FIG. 9 is graphs showing counts in sections for positive and negative polarity sides.

FIG. 9 is results of the counts of the zero cross pulses detected and counted by the counters provided for the respective sections. From the results can be measured the dispersions of jittered zero cross pulses formed from the peaks of positive and negative polarity waves.

The areas to be essentially subjected to the jittered-pulse dispersion measurement are portions near both ends of any of the discriminating windows. In this case, the measurement can be made with three phased-shifted discriminating windows A, B, and C in the least. That is, each of the sections a and d should be provided at the respective ends of the discriminating window W, the division a should be determined in terms of the discriminating windows A and B, and the discriminating windows A and B should be at H and L, respectively. The division d should be determined in terms of discriminating windows A and C, and the discriminating windows A and C should be at H. The method is featured in that sections can be determined to any desirable periods of time by making desirable phase shifts of the discriminating windows B and C from the discriminating windows A. The sections also can be made narrower by making a plurality of discriminating window signals of different phases depending on the number of sections. If the number of sections is made equal to that of the discriminating window signals, for example, the discriminating windows can be made like the embodiment described above. The number of discriminating window signals can be reduced by way of appropriate combination of them.

Figure 10:
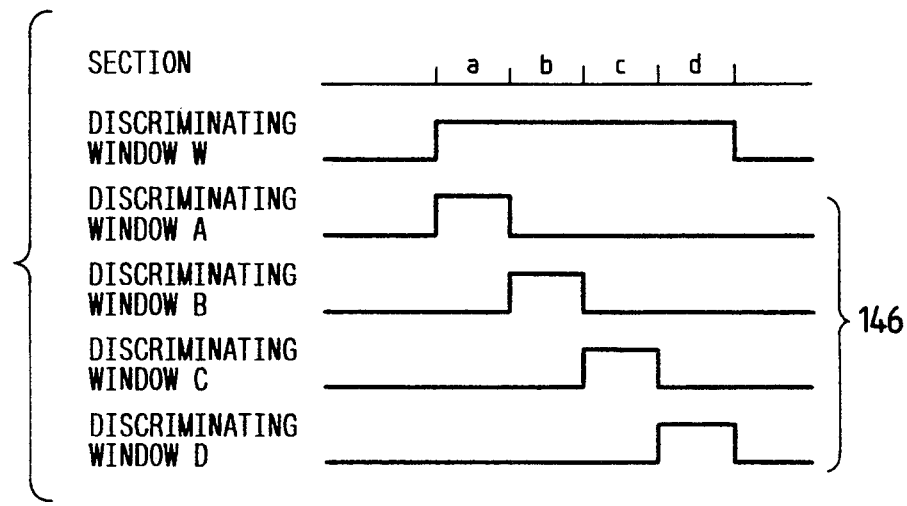
FIG. 10 illustrates another example of dividing method for dividing a discriminating window into sections.

FIG. 10 shows another embodiment of the present invention for the section allotting method illustrated in FIG. 7. First, the embodiment is to form discriminating windows having shorter periods of time in units of logical level time to which the discriminating window W is divided by number of sections. Any of the measuring circuit divides and detects the discriminating window W in units of the logical level time using a group 146 of the phase-shifted discriminating window signals as described above. If one section is to be made close to each of both ends of the discriminating window W in the embodiment, at least two kinds of discriminating window should be made.

Figure 11:
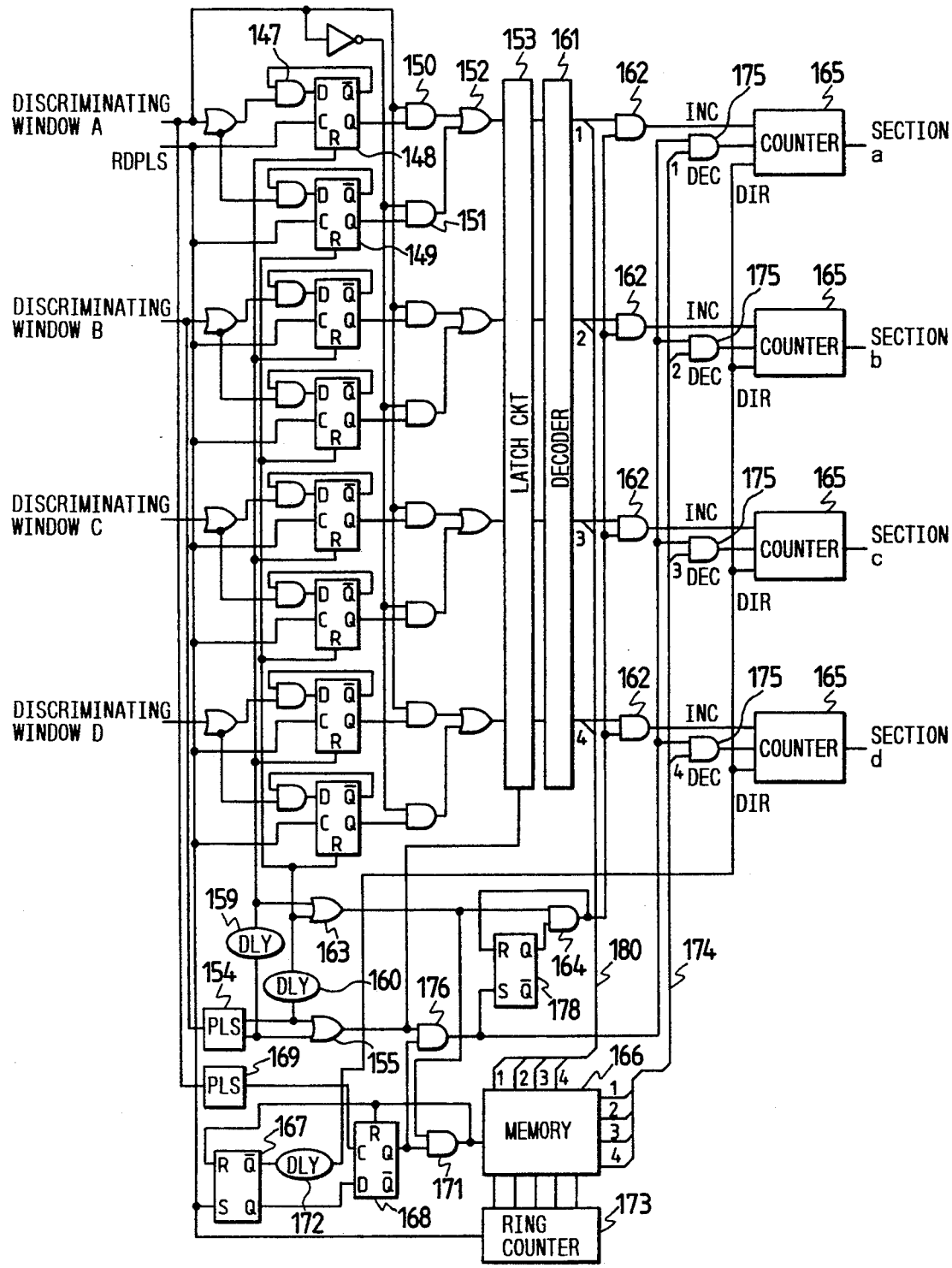
FIG. 11 is a logical circuit diagram for a circuit for measuring dispersion of jittered zero cross pulses.
Figure 12:
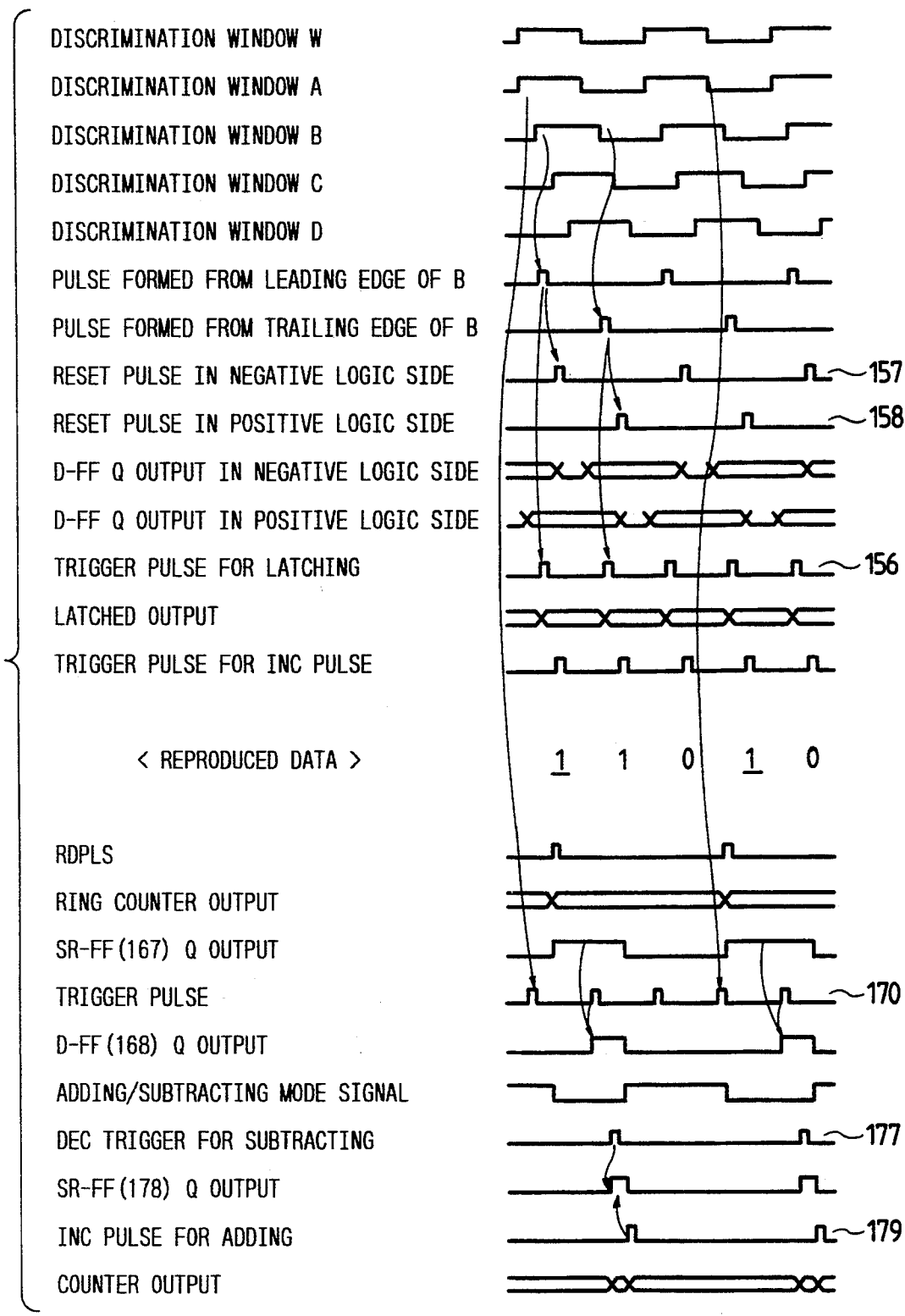
FIG. 12 is a timing chart for a circuit for measuring dispersion of jittered zero cross pulses.

In turn, FIG. 11 is a logical block diagram for any of the jitter dispersion measuring circuits 134 and 135 of jittered zero cross pulses. FIG. 12 is a timing chart for operation of the jitter dispersion measuring circuit. In the figures, the discriminating window signals are fed to detection circuits in the measuring circuit, respectively. Since the detecting circuits are all same, the one for the discriminating window A represents the others for description below.

The discriminating window A fed in may be either at H or L when the zero cross pulses are fed in. Soon after the input, the signal is divided to positive and negative logic systems. The following describes the positive logic system only. The positive discriminating window A enters one input pin of a 2-input AND circuit 147. The other input pin of the 2-input AND circuit 147 is connected to an inverse output pin of Q (hereinafter referred to as the inv-Q or abbreviated Q- in the block diagram) of a flip-flop 148 of data type (hereinafter referred to as the D-FF). Since the D-FF 148 is reset, the inv-Q is at H, and the 2-input AND circuit 147 allows the logical level of the discriminating window A to pass through. Signal output of the 2-input AND circuit 147 is connected to a data input pin (hereinafter referred to as the D) of the D-FF 148 to allow the logical level of the discriminating window A to enter the data input pin of the D-FF 148. In this state, it waits for input of the zero cross pulse (hereinafter referred to as the RDPLS). When the RDPLS enters, the D-FF 148 feeds the logical level of the D to the Q, the inv-Q has an inverse logical level of the Q. The inv-Q output blocks the 2-input AND circuit 147 to hold the level L. It is elaborated if the discriminating window A is at H, the positive D-FF 148 can operate, but if at L, a negative D-FF 149 operates. In order to select output Q of the logical D-FF 148 and output Q of the negative D-FF 149, these are connected to a selecting circuit, which comprises two AND circuits 150 and 151 and one OR circuit 152. The selection can be made depending on the logical level of the discriminating window A.

In turn, the selected outputs of the Ds of the discriminating windows are fed to latch circuit 153. Trigger pulses for latching the selected outputs are formed of a leading edge and a trailing edge of the discriminating window B as shown in FIG. 12. The discriminating window B, as shown in FIG. 11, is made into pulses by a pulser 154 (hereinafter referred to as the PLS), and the pulses are synthesized by an OR circuit 155, which produces a latching trigger pulse 156. The latching trigger pulse 156 allows the selected outputs to be taken in the latch 153. After the latching, the D-FFs 148 and 149 are reset for the next detection. Note that since the D-FFs 148 and 149 operate alternately, the D-FF 148 or 149 which is not detecting is reset during non-detection. Reset pulses are formed of the leading edge and the trailing edge of the discriminating window B. The reset pulse 157 formed of the leading edge resets the negative D-FF 149, and reset pulse 158 formed of the trailing edge resets the positive D-FF 148. The reset pulses are produced by the PLS 154 similarly as described above. The two reset pulses formed of the leading and trailing edges are individually fed out and into the respective reset pins (hereinafter referred to as the Rs) of the D-FFs 148 and 149. Note that since the resetting has to be made after the end of latching, delay circuits 159 and 160 (hereinafter referred to as the DLY) are inserted between the PLSs and the Rs, respectively, to make resetting the D-FFs 148 and 149 with use of the delayed reset pulses.

In turn, signals output of the latch 153 are fed to a decoder 161. The decoder 161 feeds signals out to the corresponding portions according to the logical combination described previously. The decoder 161 also feeds the same signals out to ones of the respective input pins of two-input AND circuits 162. Selected output lines of the decoder 161 have level H and activate the respective AND circuit 162 only. The AND circuits 162 that have not been chosen are blocked. The two kinds of delayed reset pulse are synthesized in an OR circuit 163, and further are passed through an INC pulse generating GATE circuit 164 which will be described later. Signals output of the GATE circuit 164 are fed to the other input pins of the AND circuits 162 mentioned above. The signals pass through only the active AND circuits 162. Signals output of the AND circuit 162 enter the respective increasing pins (hereinafter referred to as the INC) of counters 165 connected thereto.

It should be noted that detection are not only made for all the zero cross pulses, but also state of improvement is measured. A predetermined number of the zero cross pulses of new data, say, 1,000 zero cross pulses, are detected. For the reason, if the pulses exceed the predetermined number, the preceding detection data have to be abandoned. A memory is used to store previous detection data. The following describes how to restore the data.

First, the RDPLS enables write trigger in a memory 166. For this, the RDPLS sets a set pin (hereinafter referred to as the S) of a set-reset flip-flop (hereinafter referred to as the SR-FF) 16 to make H an output Q thereof. The H enters a data pin (hereinafter referred to as the D) of a D-FF 168 connected to the output Q. A PLS 169, on the other hand, makes trigger pulses 170 of a leading and trailing edges of the discriminating window A. The trigger pulses are fed to a trigger pin (hereinafter referred to as the C) of the D-FF 168. This allows the D input to be taken in and feeds the H out to output Q. This makes active a 2-input AND circuits 171 connected with the output Q. The AND circuit 171 waits for output of the OR circuit 163. On the other hand, each of the counters 165 is set to an adding mode for the H or a subtraction mode for the L with use of its terminal for adding/subtracting (DIR) logical level. An inv-Q output of a SR-FF 167 then enters the terminal for adding/subtracting (DIR) of the counter 165 through a delay circuit DLY 172. Let the inv-Q output of SR-FF 167 be at L and the counter 165 be in the subtracting mode for the time being.

On the other hand, the memory 166 can have addresses formed therefor as follows: First, the RDPLSs are put into a ring counter 173 as clock. The ring counter 173 counts the RDPLSs until they reach a predetermined number. Then it restarts counting from 1. A signal output of the ring counter 173 can be used as an address in the memory 266 to always hold a state of the predetermined number of pulses only.

If the data of the memory address obtained in the method described above exceed beyond the predetermined number of pulses at a second or following times, then the preceding detected data have to be abandoned. For this, read-only data lines 174 for the memory 166 are connected through respective AND circuits 175 to the respective subtracting pins (hereinafter referred to as the DEC) of the counters 165. The data are read out of the memory 166 to activate only the AND circuits 175 which are at H. Output Q of D-FF 168, on the other hand, is made to gate to feed a latching trigger 158 to an AND circuit 176 which is active only when the counter is making subtraction. This is to make a subtraction DEC trigger 177 for the counter. The subtraction DEC trigger 177 is fed to the AND circuits 175, passes through only the active AND circuits 175 to enter the counter 165. This can delete the old detected data. At the same time as the subtraction of the counter 165, it is fed to pin S of SR-FF 178 of the INC pulse generating gate circuit to set output Q to H. This activates an AND circuit connected with the output Q.

After that, the OR circuit 163 feeds out a trigger pulse delayed through DLYs 159 and 160. It passes through the AND circuit 162 which are active, to become INC pulses 179 for the counters. The delayed trigger pulse also passes the AND circuit 164 to become the INC pulses. At the same time, output of the AND circuit 164 is led to a reset pin (hereinafter referred to as the R) of SR-FF 178. SR-FF 178 thus is reset to turn output Q to L. With this status transition, the AND circuit 164 returns to the block state. It keeps its block state until the next RDPLS enter.

Also, the trigger pulse output of the OR circuit 163 enters the AND circuit 171. Since the AND circuit 171 is activated in the mode described above, the trigger pulse is fed into the memory 166 as write trigger for the memory 166 as it is. The memory 166 also receives the output signals of the decoder 161 through its data lines to store the decoded data latched precedingly at the same time as the write trigger. A signal output of the AND circuit 171 is connected to a write trigger input pin of the memory 166 mentioned above and Rs of the SR-FF 167 and D-FF 168. The SR-FF 167 and D-FF 168 have the write trigger fed to their Rs at the same time as the memory 166 has it. The SR-FF 167 and D-FF 168 feed the level L from their outputs Q. These state transitions cause the D-FF 168 to have L at its pin D. Its output Q is held at L even when the trigger is fed at its pin C. This blocks the AND circuit 171. Since the SR-FF 167 is made H at its output inv-Q, the counters 165 is set in the adding mode. Note that the DLY 172 provided at the output inv-Q of the SR-FF is made to have longer delay time than the DLYs 159 and 160 at the output of the PLS 154.

In the way explained above, it is possible to detect the numbers of zero cross pulses, or the jitter dispersion, present in the sections of the discriminating window. The circuitry described above is provided at two positions for the positive and negative polarity peak jitter distribution detections each.

Figure 13:
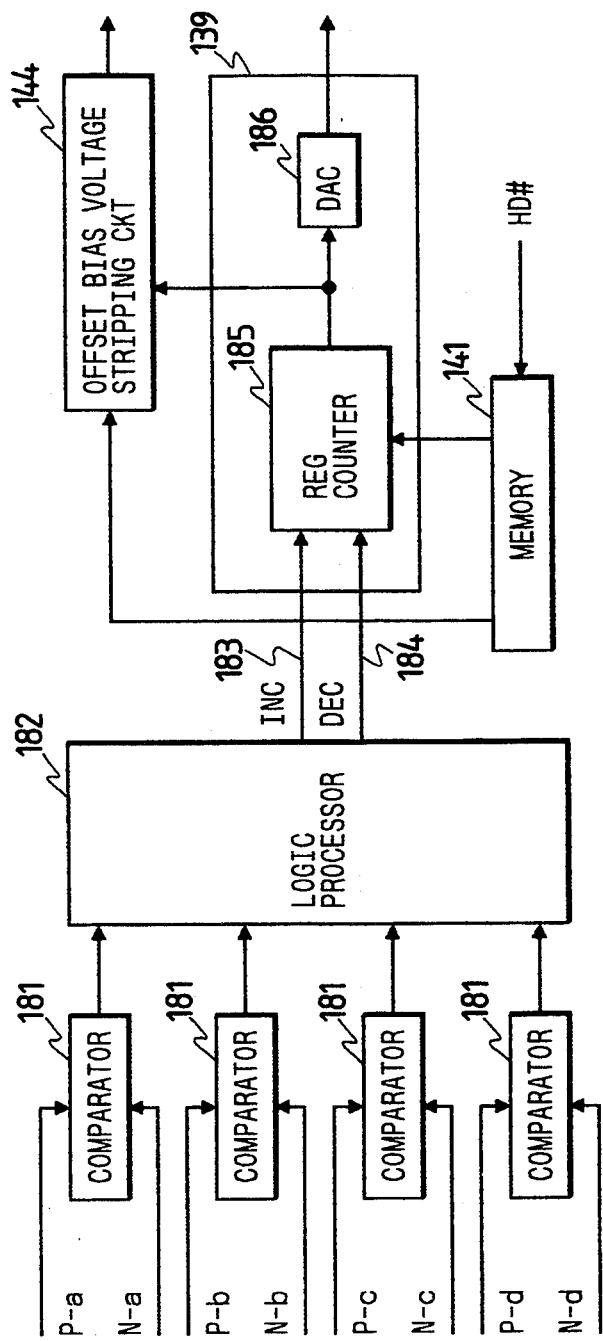
FIG. 13 is a logical circuit diagram for a biased magnetic field controlling circuit of a magnetoresistive element.

FIG. 13 is a block diagram for controlling the biased magnetic fields of the magnetoresistive elements. In the figure, comparators 181 have signals output of the counters 165 corresponding to the positive and negative polarity jittered-pulse dispersion measuring circuits 134. Each of the comparators 181 compares the positive and negative polarity counts, and feeds a result to a logic processor 182, which will be described in detail later. The logic processor 182 evaluates the positive and negative polarity counts before feeding out control signals INC 183 and DEC 184 for controlling the biased magnetic fields.

On the other hand, the bias current control circuit 139 comprises a register counter 185 (hereinafter referred to as the Reg) and a digital-analog converter circuit 186 (hereinafter referred to as the DAC). In operation, an initial value of the bias current corresponding to a head number of a selected magnetoresistive element is read out of the nonvolatile memory 141 before being set in the Reg 185. Contents of the Reg 185, in turn, are fed out to the DAC 186. The DAC 186 converts them to current corresponding to the digital data. The current output of the DAC 186 is used as bias current to supply biased magnetic field around the magnetoresistive element. If the biased magnetic field is improper, the control system described above generates the bias current control signals 183 and 184. These controls signals are an increasing pulse (INC) or a decreasing pulse (DEC) for the Reg 185. They, when applied to the Reg 185, modify the contents of the Reg 185 to obtain an optimum bias current, or biased magnetic field.

As described above, the biased magnetic field changes with the bias current. This causes change of the offset bias voltage 143 superimposed on the reproduced signal, resulting in distortion of the reproduced signal. The offset bias voltage stripping circuit 144 therefore is needed. In operation, the offset bias voltage stripping circuit 144 has the Reg signal output of the bias current control circuit 139 before calculating the offset bias voltage for the bias current. The offset bias voltage obtained is fed to the differential amplifier 145 provided before the automatic gain control 111. The differential amplifier 145 removes the offset bias voltage.

Figures 14, 15:
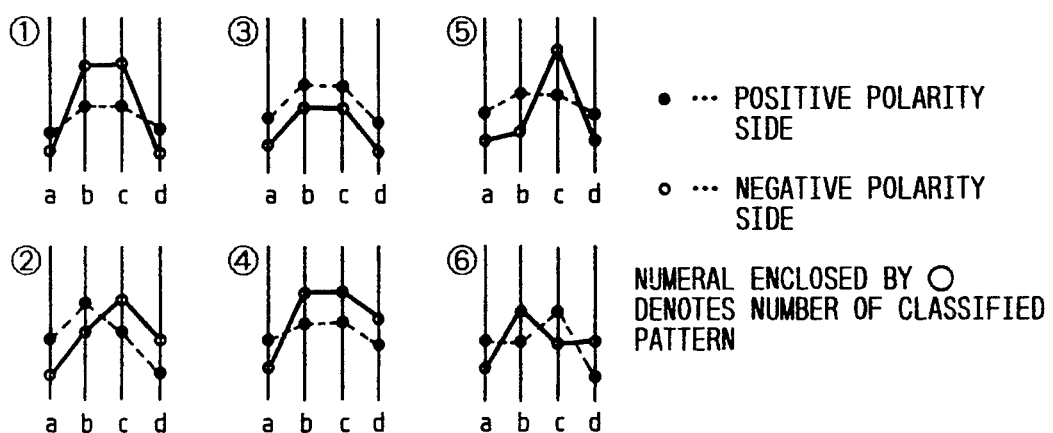
FIG. 14 is a logical chart showing results of measurement of dispersion of jittered zero cross pulses with control directions of bias current.
FIG. 15 shows patterns classified of dispersions of jittered zero cross pulses for illustration of the logical combinations in FIG. 14.

In turn, the following describes a relationship between the jittered zero cross pulse dispersion and a control direction of the biased magnetic field by reference to FIGS. 14 and 15. The relationship is contents of the logic processor described above. If the jittered zero cross pulse dispersion is detected, it contains a jitter due to noises of the zero cross pulses and a pattern peak shift due to pattern interference. The logic processor therefore has to be made to be capable of distinguishing the jitter due to the noises from the pattern peak shift. FIG. 14 is a truth table of combinations of results output of the comparator circuits and states of the output bias current control signals. State '1' in the table indicates that the counter on the positive polarity side is larger than the one on the negative polarity side, and state '0' indicates the reverse. If the counters are equal, the bias current control signal is not fed out. In the bias current control output signal, the DEC signal is a signal to be fed out if the jittered zero cross pulse dispersion on the positive polarity side is wider. The DEC signal is fed out to make the dispersion narrower. That is, the biased magnetic field is changed in a direction that a differential waveform gradient on the positive polarity side is made sharper. The INC is a control signal to make the state opposite to that of the DEC.

In turn, the following describes the logic combinations in FIG. 14. The jittered zero cross pulse dispersions are roughly classified into six patterns as shown in FIG. 15. If the positive and negative polarities may be reversed, then the patterns are regarded same. If the sections a and d and the sections b and c may be reversed, then the patterns are regarded same. With such a classification, it can be seen that any of the patterns 1, 3, and 5 has wider jittered zero cross pulse dispersion on the positive polarity (negative polarity) side. The DEC (INC) signal then should be fed out. It also can be seen that the pattern 4 has a little wider zero cross pulse dispersion on the negative polarity (positive polarity) side. The INC (DEC) signal then should be fed out. It can be seen that the pattern 2 and 6 are due to the pattern peak shift. In this case, the control signal is not fed out. FIG. 14 is a table of logic combinations charted according to the classified patterns. It is clearly found that the patterns 1, 3, and 5 have wider jittered zero cross pulse dispersions on the positive polarity side. The bias current control signal thus can be made higher. It is found by analogy that the patten 4, on the other hand, has wider jittered zero cross pulse dispersions on the negative polarity side. The bias current signal then should be made lower. If divisions of the discriminating window are increased, finer classification can be made so that the control signals INC and DEC can be controlled finely.

The logic combinations in FIG. 14 can be shown in a variety of circuit diagrams. In this embodiment, they are formulated in logical equations. The circuit diagrams can be easily drawn with use of the logical equations. The patterns 1, 3, and 5 in FIG. 15 are formulated by logical equations (1) and (2) below.

$$a-d=1$$

$$P>N \geq DEC \text{ (high)} \qquad \text{Eq. (1)}$$

$$\text{inv}(a)\cdot\text{inv}(d)=1$$

$$P<N \geq INC \text{ (high)} \qquad \text{Eq. (2)}$$

The pattern 4 is formulated by logical equations (3) and (4) below.

$$b\cdot c\cdot\{a\cdot\text{inv}(d)+\text{inv}(a)\cdot d\}=1$$

$$P<N \geq DEC \text{ (low)} \qquad \text{Eq. (3)}$$

$$\text{inv}(b)\cdot\text{inv}(c)\cdot\{a\cdot\text{inv}(d)+\text{inv}(a)\cdot d\}=1$$

$$P<N \geq INC \text{ (low)} \qquad \text{Eq. (4)}$$

The patterns 2 and 6 are formulated by logical equation (5) below.

$$\{b\cdot\text{inv}(c)+\text{inv}(b)\cdot c\}\cdot\{a\cdot\text{inv}(d)+\text{inv}(a)\cdot d\}=1$$

No control output  Eq. (5)

If all the counters have the same count, no control output is made irrespective of the logic. If the section b and/or section c have equal count, the comparison output of the sections a and d are used. If either of the section a or d has equal count, the comparison output of the section having no equal count is used. If both the sections a and d have equal count, no control output is given. With the logical combinations described above, the magnetoresistive element can be controlled to an optimum biased magnetic field.

Figure 16:
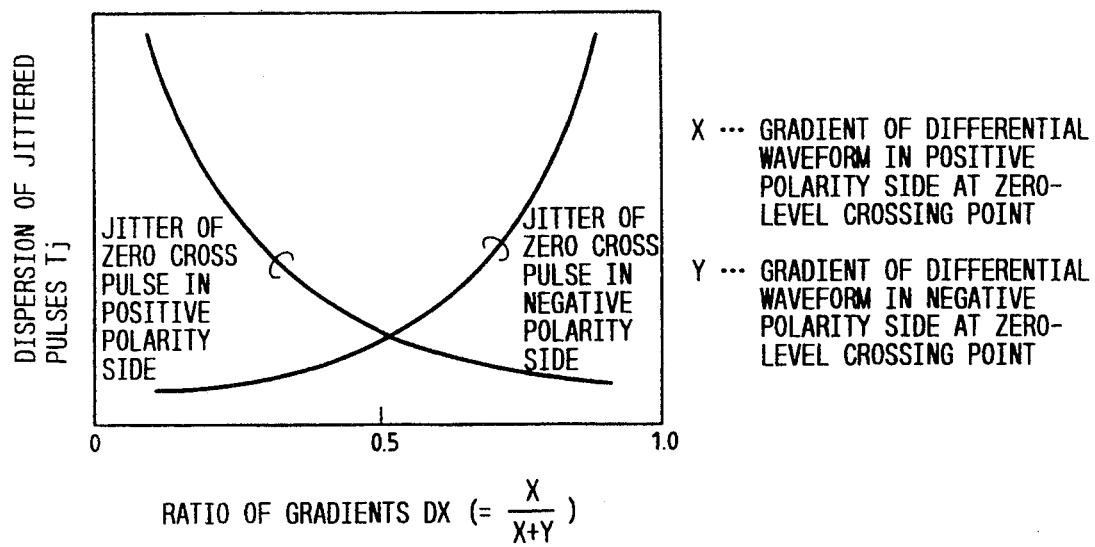
FIG. 16 is a graph illustrating dispersions of jittered zero cross pulses to ratio of gradients for positive and negative polarity sides.
Figure 17:
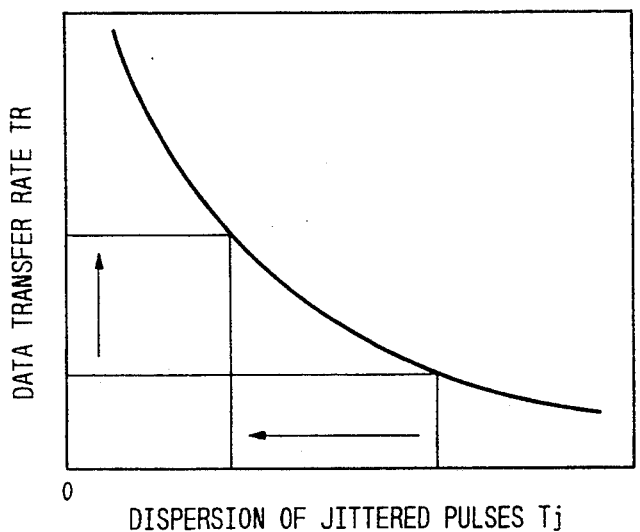
FIG. 17 is a graph showing data transfer rate to dispersion of jittered zero cross pulses.

Finally, the following describes advantages of the embodiment by reference to FIGS. 16 and 17. In FIG. 16, X is a gradient of the differential waveform on the positive polarity side at the zero level crossing point, Y is a gradient of the differential waveform on the negative polarity side at the zero level crossing point, and a gradient radio DX is $X/(X+Y)$. In the figure are shown relationships of the jittered zero cross pulse dispersions Tj on the positive polarity side and the negative polarity side to the gradient ratio DX. It can be found in the figure that the jittered zero cross pulse dispersion is narrowest when the gradient ratio DX is 0.5, or the differential gradients on the positive polarity side and the negative polarity side are equal. In the embodiment, if the gradient ratio DX deviates from 0.5, the jittered zero cross pulse dispersion is directly evaluated to control the biased magnetic field so that DX can become 0.5. This can make least the jittered zero cross pulse dispersion Tj.

FIG. 17 is a relationship of the data transfer rate TR to the jittered zero cross pulse dispersion Tj. The embodiment is featured in that the jittered zero cross pulse dispersion Tj can be made narrow without loss so that the data transfer rate TR can be made high.

Figure 18:
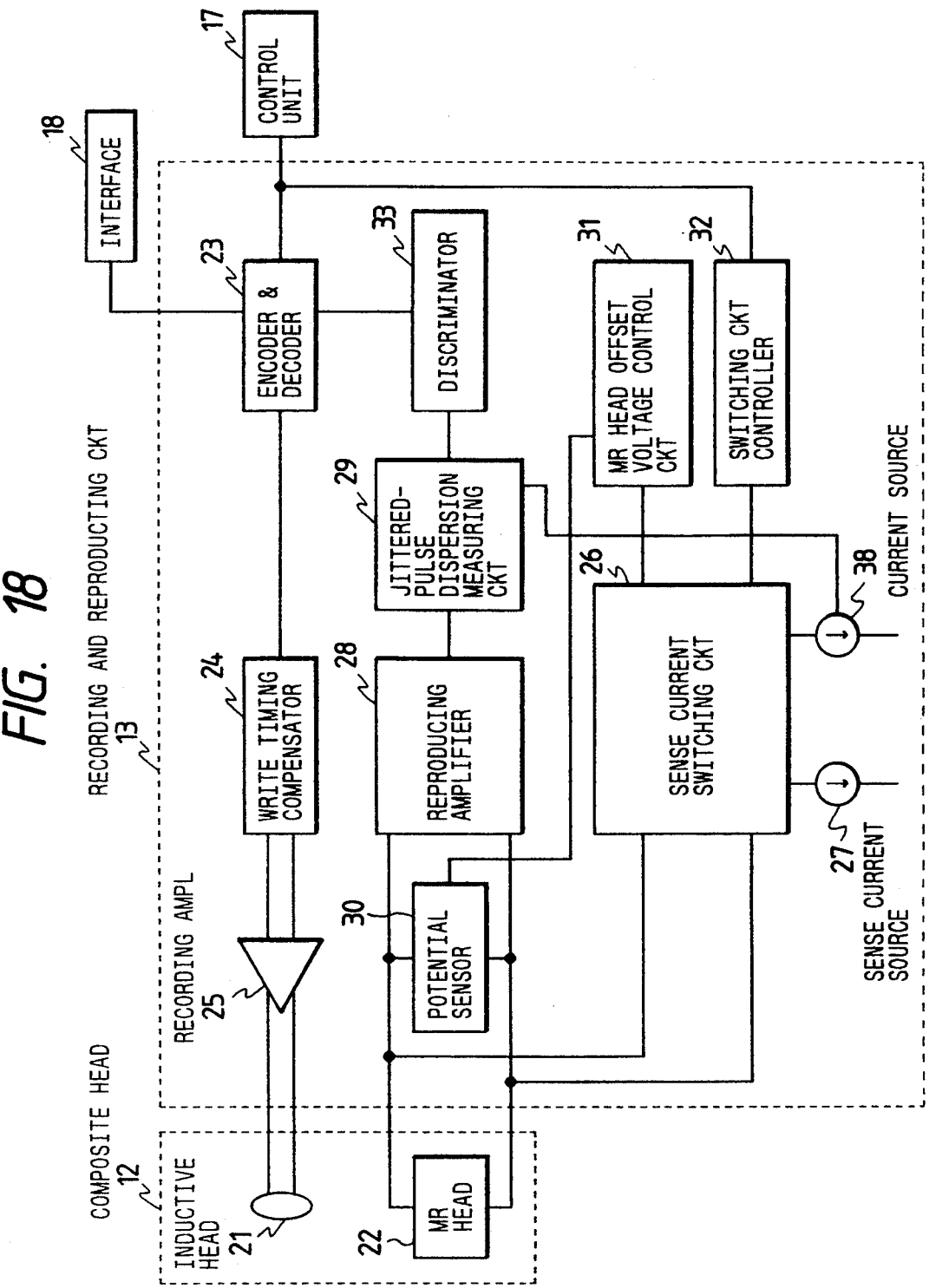
FIG. 18 is a block diagram for a recording and reproducing circuit in another embodiment according to the present invention.
Figure 19:
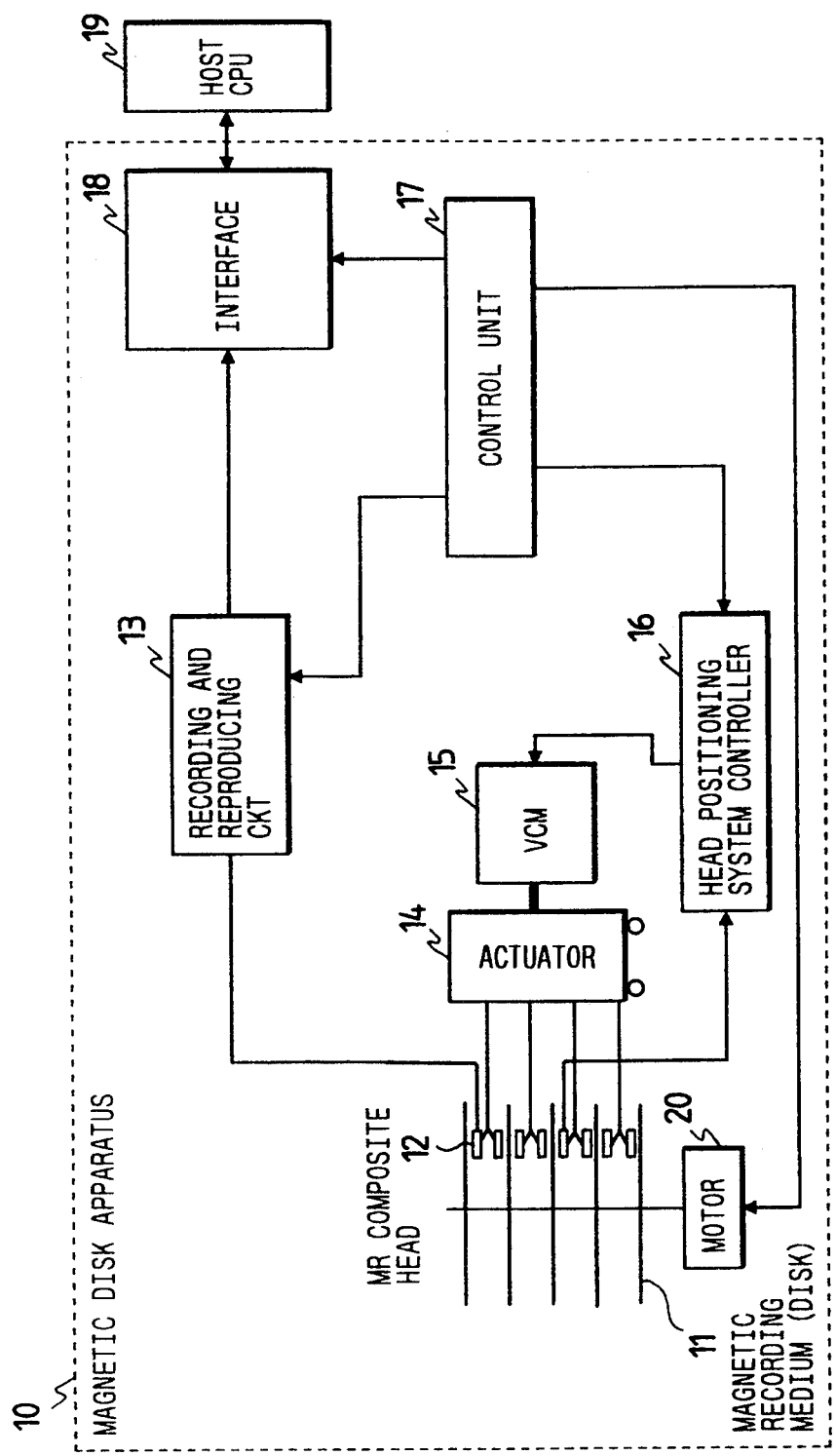
FIG. 19 is an overall conceptual diagram showing a magnetic disk recording and reproducing apparatus with use of the recording and reproducing circuit in FIG. 18.

The following describes another embodiment of the present invention be reference to FIGS. 18 and 19. In the figures, a magnetic disk apparatus comprises a single or plurality of magnetic recording mediums (disks) 11, a composite head (MR composite head) 12 having a reproducing magnetic head (MR head) 22 having at least one magnetoresistive element above any of surfaces of the magnetic medium 11 for reproducing recorded data and a recording magnetic head (inductive head) 21 for recording data on the magnetic medium 11, a recording and reproducing circuit 13 for recording or reproduction with use of the composite head 12, an interface 18 for input and/or output of data with a host CPU 19, an actuator 14 for mechanically supporting and moving the composite head 12 to a predetermined radial position of the magnetic medium 11, a voice coil motor (VCM) 15 for driving the actuator 14, a head positioning system controller 16 for fetching in and moving servo data to the predetermined radial position of the magnetic medium 11 with use of the composite head 12, and a control unit 17 for controlling the recording and reproducing circuit 13, the interface 18, the head positioning system controller 16, and a motor 20 for revolving the magnetic medium 11.

The composite head 12 comprises the inductive head 21 for use to record the data in a reversed magnetization and the MR head 22 having the magnetoresistive element(s) for reproducing the recorded data. In the embodiment is described a MR head of shunt bias type. The inventive concept of the embodiment can also be applied to a MR head of current bias type as bias current can be controlled independently.

The recording and reproducing circuit 13 comprises a recording circuit for recording with use of the inductive head 21 and a reproducing circuit for reproduction with use of the MR head 22. The recording circuit system for the inductive head 21 comprises a encoder and decoder 23 for converting the data fed from the interface 18 to a code in which the data can be efficiently recorded, a write timing compensator 24 for correcting recording timing in the recording code, and a recording amplifier circuit 25 for converting recording current to a reversed polarity form according to the writing code after the recording correction and for making it flow to the inductive head 21.

The reproducing circuit system for the MR head 22 comprises the MR head 22 having the magnetoresistive element(s), a sense current switching circuit 26 and a sense current source 27 for allowing flow of sense current to replace resistance of the MR head 22 by voltage change, a reproducing amplifier circuit 28 for amplifying the voltage change across the MR head 22, a jittered-pulse dispersion measuring circuit 29 for detecting non-linear distortion of the reproduced signal from a signal of the reproducing amplifier circuit 28, a potential sensor 30 for detecting potential of the MR head 22, a MR head offset voltage control circuit 31 for controlling the potential of the MR head 22 with use of signals output of the potential sensor 30 and the jittered-pulse dispersion measuring circuit 29 and for controlling effect efficiency of the sense current, a switching circuit controller 32 for switching the sense current to prevent electromigration of the MR head 22, a discriminator circuit 33 for having the reproduced signal fed therein from the jittered-pulse dispersion measuring circuit 29 in an optimum state to judge of '1' and '0', and the encoder and decoder 23 for decoding a signal output of the discriminator circuit 33.

Figure 20:
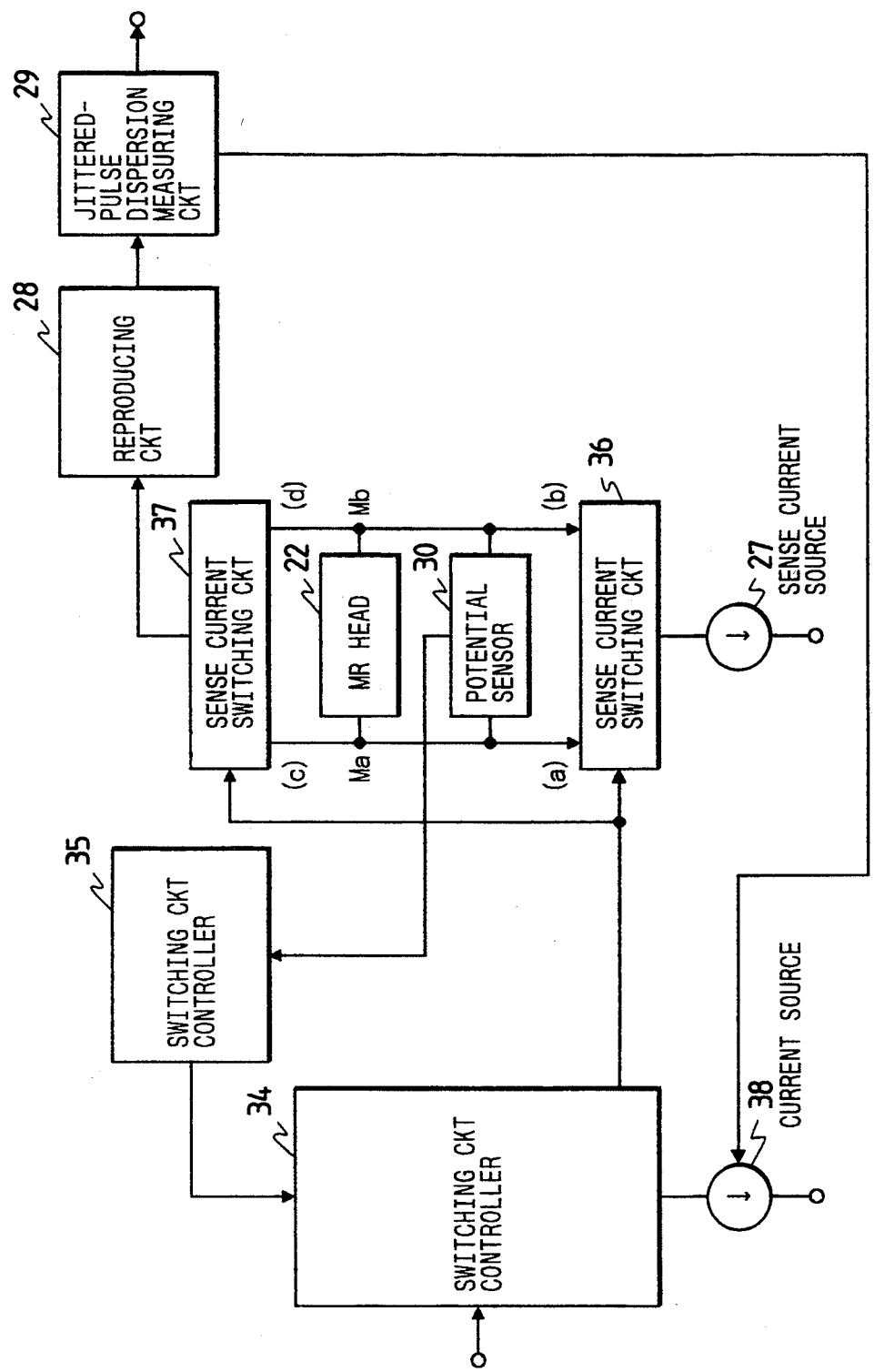
FIG. 20 is a block diagram showing the recording and reproducing circuit having an MR head sense current drive circuit and an overcurrent protection circuit used in FIG. 18.
Figure 21:
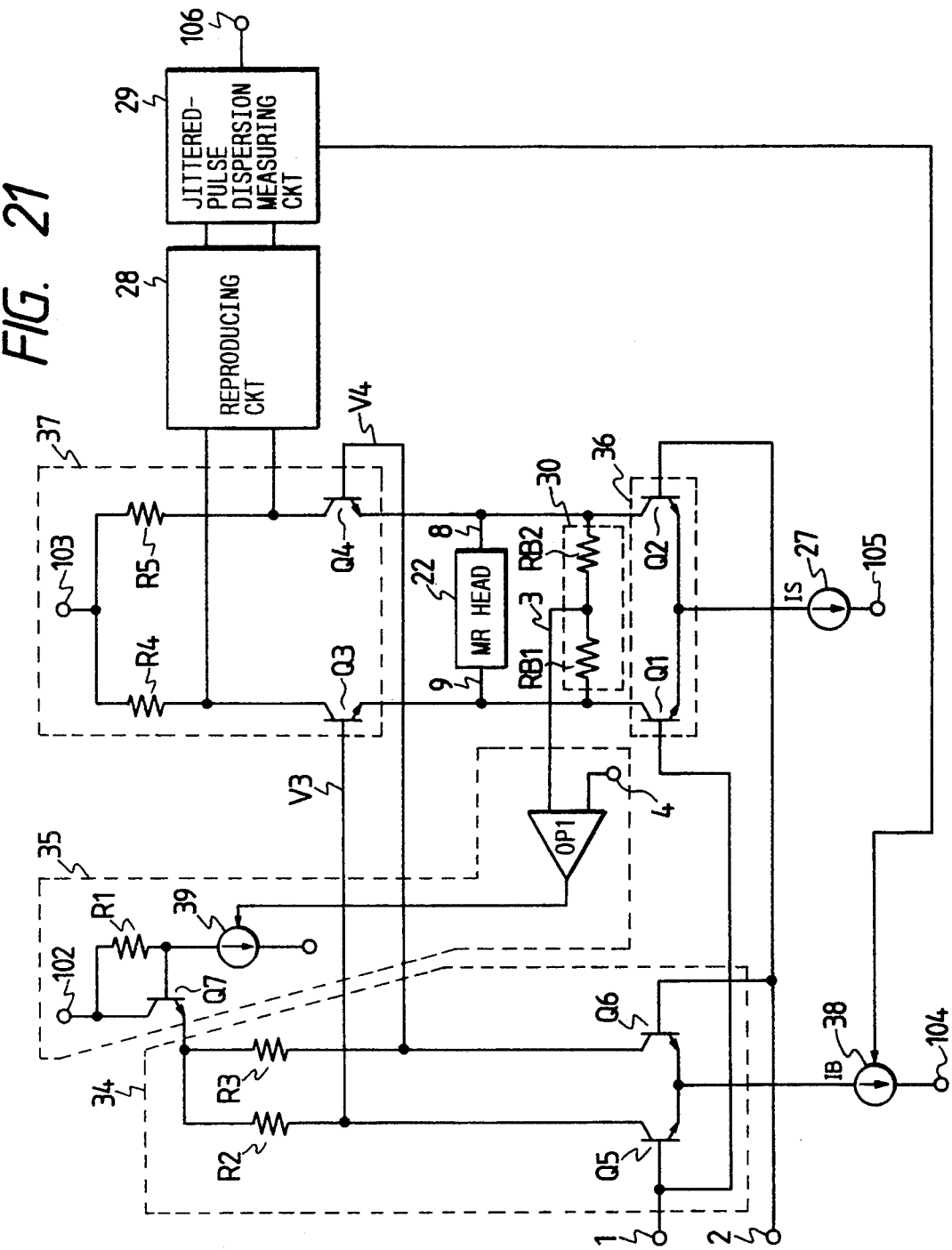
FIG. 21 is a detailed circuit diagram showing the MR head sense current drive circuit and the overcurrent protection circuit used in FIG. 20.
Figure 22:
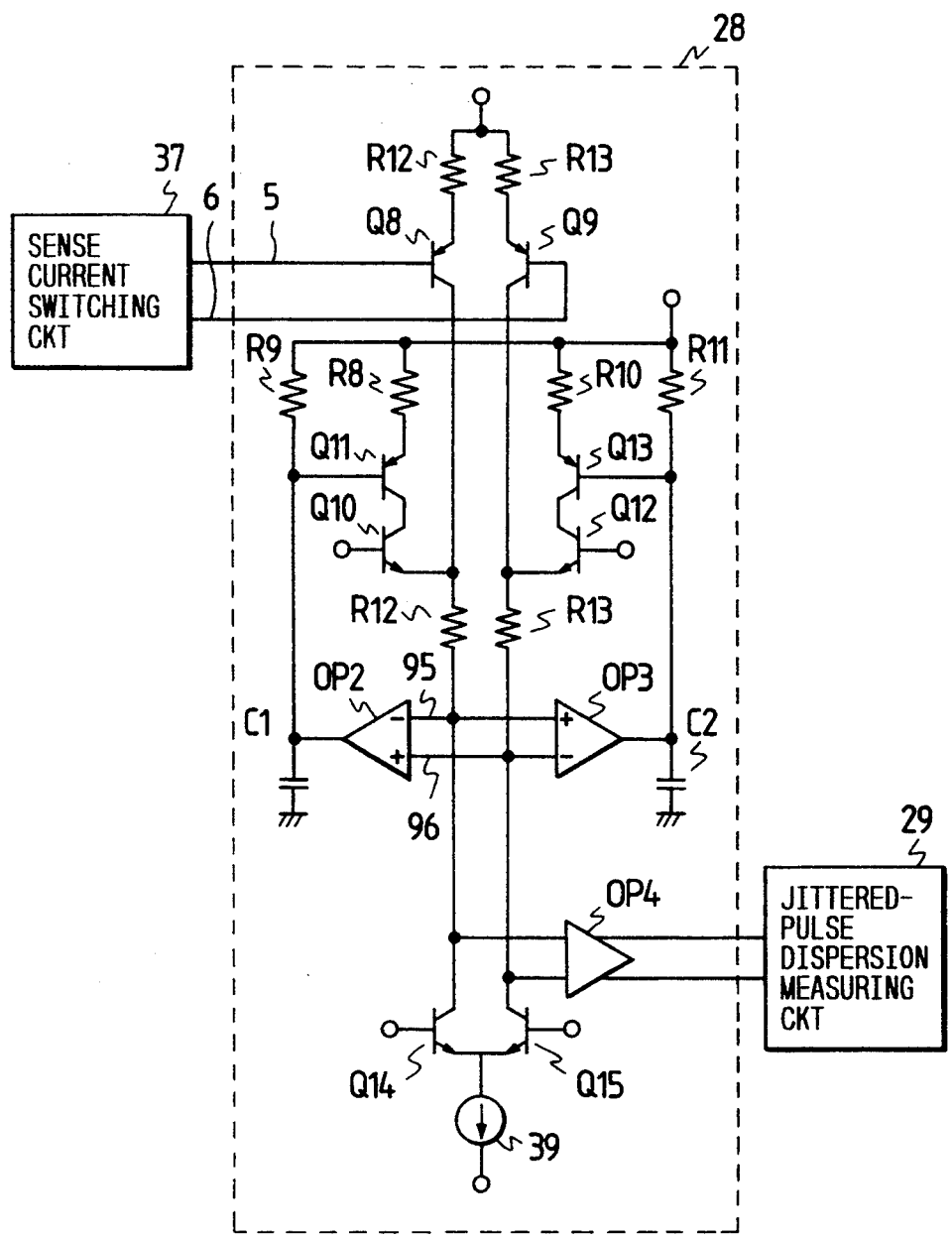
FIG. 22 is a detailed circuit diagram showing the reproducing amplifier circuit for use in the circuit illustrated in FIGS. 20 and 21.

The following describes operation of the embodiment by reference to FIGS. 20, 21, and 22. In order to convert the resistance change of the MR head 22 to the voltage change, the sense current is made to flow through the sense current source 27 to the MR head 22. To prevent the then electromigration, sense current switching circuits 36 and 37 change a flowing direction of the sense current for the MR head 22 every certain timing. The sense current switching circuits 36 and 37 are controlled by switching control circuits 34 and 35.

Change of the sense current caused in the MR head 22 is fed to the reproducing amplifier circuit 28 through the sense current switching circuit 37. The reproducing amplifier circuit 28 can eliminate an offset voltage, convert the sense current change to differential signal, and amplify it.

After this, the amplified reproduced signal output is fed to the jittered-pulse dispersion measuring circuit 29. The jittered-pulse dispersion measuring circuit 29 detects magnitude of the non-linear distortion at the peak of the reproduced signal by magnitude of the jitter, and adjust the sense current to be made to flow to the MR head 22, or the biased magnetic field, so that magnitudes of the jitters at the peak of positive polarity side and the peak of negative polarity side should be equal.

FIG. 21 is a detailed circuit of the block diagram in FIG. 20. The following describes operation of the circuit. Two signals 1 and 2 input to the switching control circuit 34 can control the sense current switching circuit 36 having a current switching circuit of transistors Q1 and Q2 therein. It is preferable that the input signals 1 and 2 should be logical to securely switch the transistors Q1 and Q2. Let the input signal 1 be at a higher level than the input signal 2 as an example. In this state, Q1 is on, Q2 is off. The sense current (IS) generated by the sense current source 27 to be made to flow to the MR head 22, therefore, flows through the Q1 side.

On the other hand, input signals 1 and 2 also are connected to transistors Q5 and Q6 of the switching control circuit 34. Q5 is on and Q6 is off as the case with Q1 and Q2. That is, current (IB) of a current source 38 flows through Q5. A resistor R2 connected to a collector of Q5 has a voltage V3 with a voltage drop R2×IB. A resistor R3 connected to a collector of Q6 has a voltage V4 without voltage drop. Grounded-base transistors Q3 and Q4 of the sense current switching circuit 37 are controlled as follows: The voltage drop through the resistor R2 makes a base voltage V3 of Q3 lower than a base voltage V4 of Q4. Since the MR head 22 is connected between emitters of Q3 and Q4, a MR head pin 8 on the Q4 side has higher voltage in this example of operation. This causes the sense current to flow from the MR head pin 8 to a MR head pin 9. A potential difference between the emitters of Q3 and Q4 becomes V4−V3. Let an electrical resistance of the MR head 22 be RH. The sense current IS' flowing to the MR head is $$IS'=(V4-V3)/RH.$$

A difference from the sense current IS generated by the sense current source 27 to the sense current IS' flowing to the MR head 22 is $$ISB=IS-IS'.$$

The difference current ISB flows to the transistor Q3. A resistor R4 connected to a collector of Q3 causes a voltage drop. The Q4 side has the sense current IS' flowing the MR head 22. A resistor R5 connected to a collector of Q4 causes a voltage drop. The MR head 22, on the other hand, has a resistance change depending on the magnetic field. Since the voltage between the emitters of Q3 and Q4 is constant, the change of magnetic field appears as change of the sense current. Let the resistance change in the MR head 22 be Rh, and let the then change of the sense current be ΔIs'. The sum of IS' and ΔIs' is $$IS' + \Delta Is' = (V4 - V3)/(RH + \Delta Rh).$$

Since the sense current IS of the sense current source 27 is constant, on the other hand, Q3 also can have the change ΔIs' of the sense current flow therein.

If the sense current IS' flowing in the MR head 22 deviates from the ISB flowing in the Q3 side, magnitudes of the voltage drops by the resistors R4 and R5 differ. The offset voltage is produced at the same time as the reproduced signal. The reproduced signal containing the offset voltage is fed out to the reproducing amplifier circuit 28.

On the other hand, in view of the reproducing state by the MR head 22, the potential of the MR head 22 drops from the emitter potential of the transistor Q4 by RH×IS' volts. Since magnetic medium 11 is ordinarily set at a reference potential 4, a potential difference appears between the MR head 22 and the magnetic medium 11. The potential difference causes intermittent contact between the MR head 22 and the magnetic medium 11. In an extremely narrow floating state, it causes an excessive current to flow between the MR head 22 and the magnetic medium 11, resulting in breakdown of the MR head 22. In order to protect the MR head 22, a control method described below is employed.

First, in order to detect the potential difference between the MR head 22 and the magnetic medium 11, the embodiment has the potential sensor 30 comprising two resistors RB1 and RB2 placed in parallel with the MR head 22. One end of RB1 is connected to a collector of the transistor Q1, and one end of RB2 is connected to a collector of the transistor Q2. The potential of MR head 22 is monitored at a point 3 at which RB1 and RB2 are connected together. Comparison of the monitor potential with the reference potential 4 is made by a level comparator circuit OP1. A result of the comparison controls a current source 39 in a way that if the potential of the MR head 22 is higher than the reference potential 4, the level comparator circuit OP1 feeds out a current of the current source 39 in an increase direction. With the increase of the current of the current source 39, the voltage drop of the resistor R1 becomes higher. A base voltage of a transistor Q7 decreases by an amount of increase of the voltage drop of R1. This causes an emitter voltage of Q7 to decrease. Since a current IB of the current source 38 does not change, the base and emitter potentials of the transistors Q3 and Q4 decrease. As a result, the potential of the MR head 22 also decreases. In such a way of operation, the potential of the MR head 22 can be always kept at the reference voltage 4.

With use of the MR head protecting circuit method described above, the excessive current cannot flow even when the MR head 22 contacts the magnetic medium 11 in a contact start/stop (CSS) at the time of start of the magnetic disk apparatus. This can protect the MR head 22.

In turn, to prevent the electromigration, the direction of the sense current flowing in the MR head 22 has to be changed. For the purpose, the two signals 1 and 2 input to the switching control circuit 34 should be changed in their high and low levels at a certain timing.

The magnitude of the non-linear distortion is detected by the jittered-pulse dispersion measuring circuit 29, and its output signal is fed back to the current source 38. Their operation is described below by reference to FIGS. 21 and 5. First, if bias is made with the sense current corresponding to a bias Ha in FIG. 5, the positive peak of the output waveform is subjected to the non-linear distortion. The non-linear distortion is detected in a method that will be described later. The detection result controls the current IB of the current source 38 in the increase direction. In the switching control circuit state described above, the voltage drop across the resistor R2 increases with the current IB. In other words, the potential difference between the emitters of the transistors Q3 and Q4 becomes higher. The sense current for the MR head 22 increases with the increase of the potential difference between the emitters. With the increase of the sense current IS', the biased magnetic field is made higher. As a result, the bias correction can be made up to a bias Hb shown in FIG. 5. The output waveform does not have non-linear distortion. Even if any, it is made virtually equal both at the positive and negative peaks.

In turn, the following describes the reproducing amplifier circuit 28 by reference to FIG. 22. An object of the reproducing amplifier circuit 28 is to eliminate the offset voltage and to amplify signal components. In operation, a signal output of the sense current switching circuit 37 is fed to bases of transistors Q8 and Q9. For convenience of description, assume that the offset voltage 5 be higher than the offset voltage 6. Q8 thus has higher current flow than Q9. A voltage drop across a resistor R13 connected to Q9 is higher than that of a resistor R1 connected to a collector of Q8. Since the collectors of Q8 and Q9 are fixed at an equal potential by transistors Q10 and Q12, on the other hand, difference of the currents becomes difference of the collector potentials of Q14 and Q15.

In turn, the collector potentials of Q14 and Q15 are compared by potential comparing circuits OP2 and OP3. The following description is of operation of OP2 alone as that of OP3 is same as OP2 although the polarity is reversed. A comparison result by OP2 is converted to current before being fed out. Since the voltage drop across R12 is lower in the state of operation here, an inversion signal 95 input to OP2 has higher voltage than a normal signal 96. As a result, it operates in an increase direction of current. With the current increase, the voltage drop across the resistor R9 becomes higher to lower a base potential of a transistor Q11. At the same time, the voltage applied across R8 becomes higher, allowing current flowing through Q11 to increase. A collector current of Q11 is fed to the collector of Q8 through Q10. The current flowing through R12 thus is increased to increase the voltage drop. The collector potentials of Q14 and Q15 are finally made equal. In addition, the potential comparing circuits OP2 and OP3 have capacitors C1 and C2 connected to the respective outputs to eliminate the signal components. Q14 and Q15 thus have only the signal components remained between their collector potentials with the offset voltage removed. The collector potential difference of Q14 and Q15 is amplified through an amplifier circuit OP4 before being fed out to a jittered zero cross pulse dispersion measuring circuit 29. Since a current source 39 supplies a constant current to the circuit, signal current is made to flow to Q14 and Q15 in a differential state.

Parts or all of the reproducing circuit system described above can be easily integrated in IC as they do not virtually use any capacitance elements and inductance elements.

Figure 23:
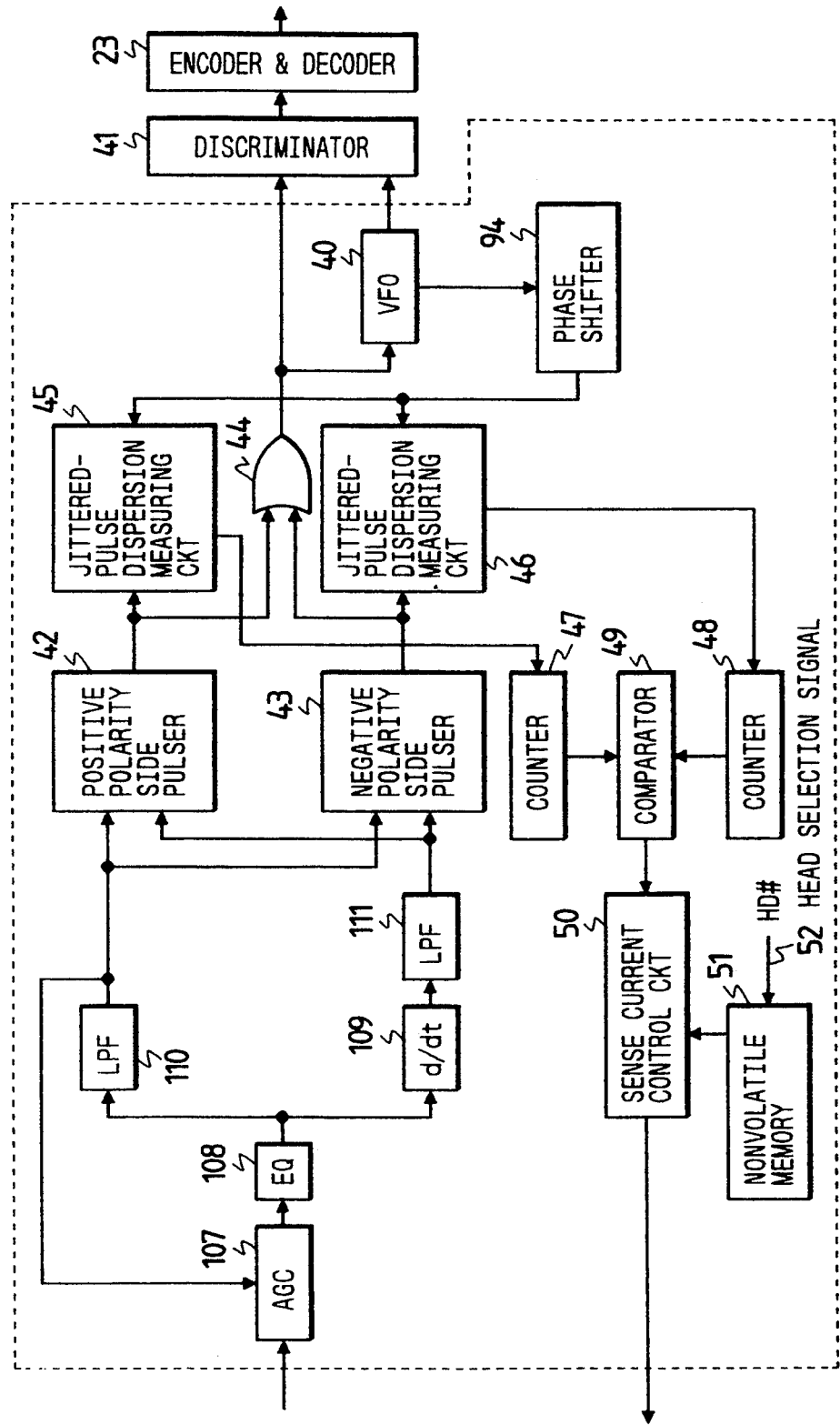
FIG. 23 is a block diagram showing the circuit for measuring dispersion of jittered zero cross pulses illustrated in FIGS. 20 and 21.

The following describes the jittered zero cross pulse dispersion measuring circuit 29 by reference to FIG. 23.

The jittered-pulse dispersion measuring circuit 29 is an embodiment for controlling so that change of the resistance of the MR head 22 to the magnetic field can be made virtually equal at the positive and negative polarity waveform peaks. First, in the following are described differences of use of the MR head 22 from the usual phase discriminating circuit while its outline and functions are compared with the principles. A first change is in that the pulser for producing the zero cross pulse is divided to a positive polarity side pulser 42 for producing a zero cross pulse of the positive polarity peak of the waveform output of the MR head and a negative polarity side pulser 43 for producing the other zero cross pulse of the negative polarity peak. This is to allow the zero cross pulse at the positive polarity and the one at the negative polarity to be controlled individually. The individually produced zero cross pulses are synthesized through an OR circuit 44. The synthesized pulse is fed through a variable frequency oscillator (VFO) 40 to a discriminator 41 as usual.

On the other hand, signals output of the positive polarity side pulser 42 and the negative polarity side pulser 43 are fed to circuits 45 and 46 for measuring dispersion of jittered zero cross pulses. The circuits 45 and 46 will be described in detail later. There are provided counters 47 and 48 corresponding to their respective timing positions in the discriminating windows. Signals output of the circuits 45 and 46 are fed to the respective counters 47 and 48 corresponding to the timing positions of the zero cross pulses. This process is made for a plurality of zero cross pulses. A time position of a maximum value of the counters is regarded as a averaged value. Time dispersion around the averaged value indicates the dispersion of jittered zero cross pulse.

In turn, counts of the counters 47 and 48 are compared by a comparator 49. Results are classified into a number of types of patterns. The patterns are used to control a ratio of shunt current to the MR head. A sense current control circuit 50 controls the sense current on the bases of the comparison results.

On the other hand, if a new MR head is selected, the sense current control circuit 50 has to first give an initial value of the sense current IS' to the selected MR head. For the purpose, the initial values for the MR heads should be read out of a nonvolatile memory 51. In the readout, contents of the nonvolatile memory 51 are read out according to data of a head select signal (HD#) 52 connected to the nonvolatile memory 51.

Principles of the circuits for measuring dispersion of jittered zero cross pulses have been already described by reference to FIGS. 7, 8, 9, and 10.

The logical block diagram for any of the dispersion circuits for measuring of jittered zero cross pulses is identical with the one in FIG. 11.

Figure 24:
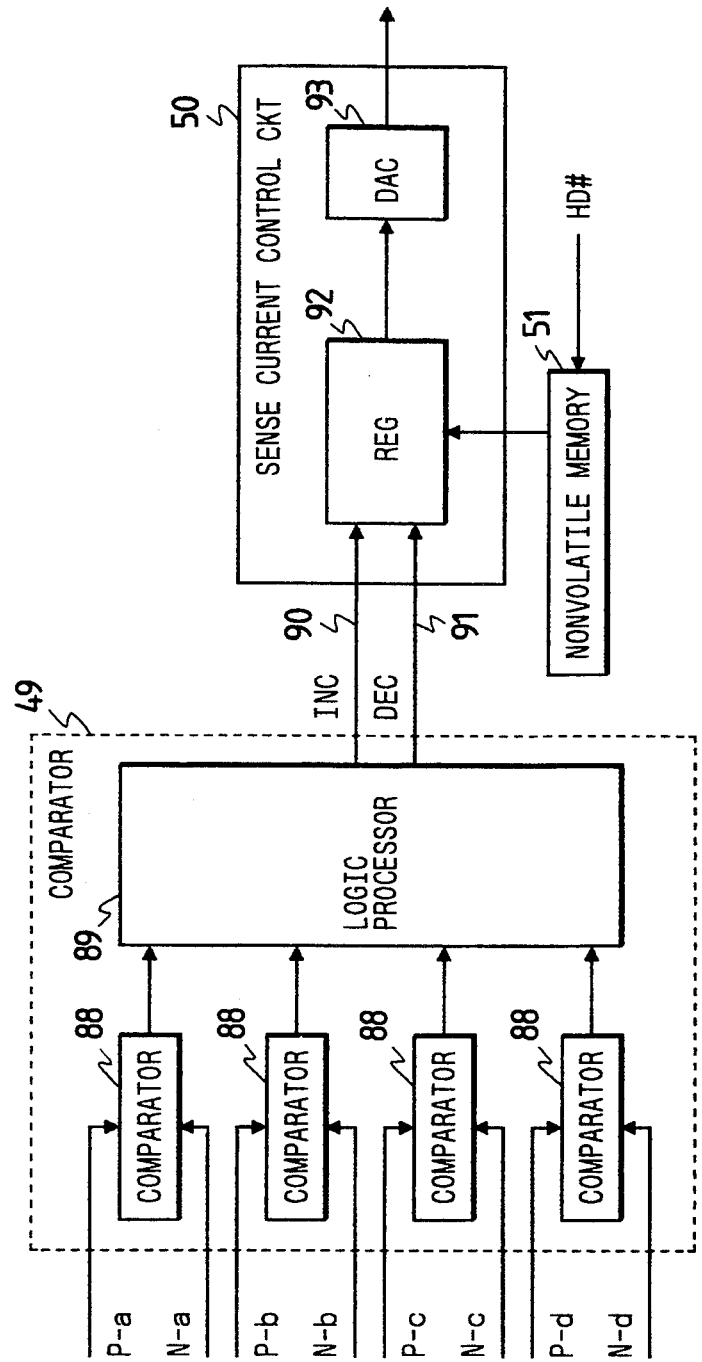
FIG. 24 is a detailed block diagram showing a comparator circuit and a sense current control circuit in the circuit for measuring dispersion of jittered zero cross pulses illustrated in FIG. 23.

FIG. 24 is a block diagram for controlling the biased magnetic fields of the MR heads. In the figure, comparators 88 have signals output of the counters corresponding to the positive and negative side of the circuits for measuring dispersion of jittered-pulse. Each of the comparators comparator 88 compares the positive and negative polarity counts, and feeds a result to a logic processor 89, which will be described in detail later. The logic processor 89 evaluates the positive and negative polarity counts before feeding out control signals INC 90 and DEC 91 for controlling the biased magnetic fields.

On the other hand, the sense current control circuit 50 comprises a register counter (Reg) 92 and a digital-analog converter circuit 93. In operation, an initial value of the bias current corresponding to a head number of a selected MR head is read out of the nonvolatile memory 51 before being set in the Reg 92. Contents of the Reg 92, in turn, are fed out to the DAC 93. The DAC 93 converts them to levels corresponding to the digital data. The ratios of the sense currents are controlled according to the levels. If the biased magnetic field is improper, the control system described above generates the sense current control signals 90 and 91. These controls signals are an increasing pulse (INC) 90 or a decreasing pulse (DEC) 91 for the Reg 92. They, when applied to the Reg 92, modify the contents of the Reg 92 to obtain an optimum sense current, or biased magnetic field.

The relationship between the dispersion of jittered zero cross pulse and the control direction of the biased magnetic field has been already described by reference to FIGS. 14 and 15.

Finally, advantages of the embodiment are similar to those of the one described by reference to FIGS. 16 and 17.

What is claimed is:

1. A magnetic recording and reproducing apparatus comprising:
    an inductive recording head for recording data on a magnetic recording medium;
    a magnetoresistive reproducing head for reproducing data from the magnetic recording medium;
    a phase discriminating circuit including a differential circuit for differentiating a waveform of a signal reproduced by said magnetoresistive reproducing head, a pulse circuit for producing a zero cross pulse from a zero-level crossing point of the differentiated waveform, and a discriminator circuit for discriminating "1" and "0" of the data in accordance with pulses output from said pulse circuit including a discriminating window enabling judgment of the "1" and "0 of the data;
    a decoding circuit for decoding the output of said phase discriminating circuit and for providing an output of decoded data; and
    means for controlling a magnetic bias level for said magnetoresistive reproducing head so that a dispersion of jittered zero cross pulses of a positive polarity waveform of the signal reproduced by said magnetoresistive reproducing head is made substantially equal to a dispersion of jittered zero cross pulses of a negative polarity waveform of the signal reproduced by said magnetoresitive reproducing head.

2. A magnetic recording and reproducing apparatus according to claim 1, wherein the means for controlling the magnetic bias level comprises:
    means for individually forming the positive and negative polarity side zero cross pulses of the waveform reproduced by the magnetoresistive reproducing head;
    means for evaluating the dispersions of the jittered zero cross pulses on the positive and negative polarity sides; and,
    means for controlling a biased magnetic field for a magnetoresistive element on the basis of the evaluation so that the dispersions of the jittered zero cross pulses on the positive and negative polarity sides are substantially equal.

3. A magnetic recording and reproducing apparatus according to claim 2, wherein the means for evaluating the dispersions of the jittered zero cross pulses on the positive and negative polarity sides, comprises:

means for detecting the zero cross pulses of the positive and negative polarity sides in the discriminating window that is divided into two or more sections;

means for obtaining time dispersions of the positive and negative polarity sides by counting the number of the zero cross pulses in each of the sections; and, means for comparing the counted numbers of the zero cross pulses of the positive and negative polarity sides.

4. A magnetic recording and reproducing apparatus according to claim 3, wherein the means for detecting the zero cross pulses of the positive and negative polarity sides in the discriminating window that has been divided into two or more sections, comprises in combination:

means for delaying the discriminating window to two or more phases;

means for discriminating the same zero cross pulses in parts or all of the delayed discriminating window; and, means for obtaining positions of the sections in the discriminating window by way of combinations of results of the discrimination.

5. A magnetic recording and reproducing apparatus according to claim 3, wherein a plurality of discriminating windows are provided and placed at distribution positions at which the dispersions of the plurality of zero cross pulses detected in the discriminating windows provided corresponding to timing positions of the zero cross pulses are averaged.

6. A magnetic recording and reproducing apparatus according to claim 1, further comprising in combination:

means for obtaining an offset bias voltage in a reproducing mode of operation with input of a signal representing the magnitude of the biased magnetic field from the means for controlling the biased magnetic field; and, means for eliminating the offset bias voltage with use of the offset bias voltage obtained and the signal reproduced by the reproducing head.

7. A magnetic recording and reproducing apparatus according to claim 6, wherein the means for eliminating the offset bias voltage feeds into a differential amplifier circuit the signal reproduced by the reproducing head and the offset bias voltage obtained by the means for obtaining the offset bias voltage.

8. A magnetic recording and reproducing apparatus according to claim 6, further comprising in combination:

means including a volatile memory element for storing initial value data of the biased magnetic field and calculation data of the offset bias voltage; and, means for feeding the initial value data and the calculation data of the offset bias voltage for the selected magnetoresistive reproducing head from the memory element to the means for controlling the biased magnetic field and to the means for obtaining the offset bias voltage.

9. A magnetic recording and reproducing apparatus according to claim 8, wherein the means for obtaining the offset bias voltage approximates a relationship function between the magnetic field and the electrical resistance of a magnetoresistive element, and reads a coefficient of the function out of the volatile memory element for each of the selected magnetoresistive heads.

10. A magnetic recording and reproducing apparatus according to claim 1, wherein the means for controlling the biased magnetic field can correct the biased magnetic field whenever the zero cross pulse is generated.

* * * * *